US012645650B2

(12) United States Patent

Dokuru et al.

(10) Patent No.: US 12,645,650 B2

(45) Date of Patent: Jun. 2, 2026

(54) SYSTEMS AND METHODS FOR MANAGING DATABASE MIGRATION BASED PREDICTED RESOURCE USAGE

(71) Applicant: BANK OF AMERICA CORPORATION, Charlotte, NC (US)

(72) Inventors: Sumanth R. Dokuru, Jacksonville, FL (US); Steven Nathan Greene, Scarsdale, NY (US); Jose Eduardo Marquez, Jacksonville, FL (US); Kerry Vaughan, Lawrenceville, NJ (US); Khwaja M. Wasimuddin, Fort Worth, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/929,118

(22) Filed: Oct. 28, 2024

(65) Prior Publication Data

US 2026/0119465 A1     Apr. 30, 2026

(51) Int. Cl.
　　 G06F 16/21　　　(2019.01)
　　 G06F 16/25　　　(2019.01)
(52) U.S. Cl.
　　 CPC .......... G06F 16/214 (2019.01); G06F 16/254 (2019.01)
(58) Field of Classification Search
　　 CPC ............................ G06F 16/214; G06F 16/254
　　 See application file for complete search history.

(56) References Cited

U.S. PATENT DOCUMENTS

| | | | |
|---|---|---|---|
| 10,725,886 B2 | 7/2020 | Savolainen | |
| 10,776,244 B2 | 9/2020 | Davis | |
| 10,846,305 B2 | 11/2020 | Merriman | |
| 11,520,755 B2 | 12/2022 | Rao | |
| 11,847,103 B2 | 12/2023 | Earnesty, Jr. | |
| 11,941,275 B2 | 3/2024 | Dwarampudi | |
| 11,989,101 B2 | 5/2024 | Ramohalli Gopala Rao | |
| 12,099,483 B2 | 9/2024 | Earnesty, Jr. | |
| 2020/0334088 A1* | 10/2020 | Casillas | G06F 9/5077 |
| 2020/0364189 A1* | 11/2020 | Lee | G06F 21/64 |
| 2022/0083370 A1 | 3/2022 | Barker, Jr. | |
| 2024/0283846 A1* | 8/2024 | Krishnaiah | G06F 16/285 |
| 2024/0338254 A1* | 10/2024 | Muttikal Thomas | G06F 9/505 |

* cited by examiner

*Primary Examiner* — Courtney Harmon

(74) *Attorney, Agent, or Firm* — Moore & Van Allen PLLC; Nicholas C. Russell

(57) ABSTRACT

Managing database migration based on predicted resource usage. A datafile is received of data of a resource allocating platform that includes database(s). In response, the datafile is queried for resource usage data of the database(s) and resource capacity data, the resource usage data and the resource capacity data is extracted, and a growth rate of the resource usage data is generated. Subsequently, resource usage of the one or more databases on a future date is predicted and compared against a resource capacity from the resource capacity data. If the predicted resource usage of the one or more databases exceeds the resource capacity, a database from amongst the database(s) is migrated from the resource allocating platform to another resource allocating platform.

17 Claims, 11 Drawing Sheets

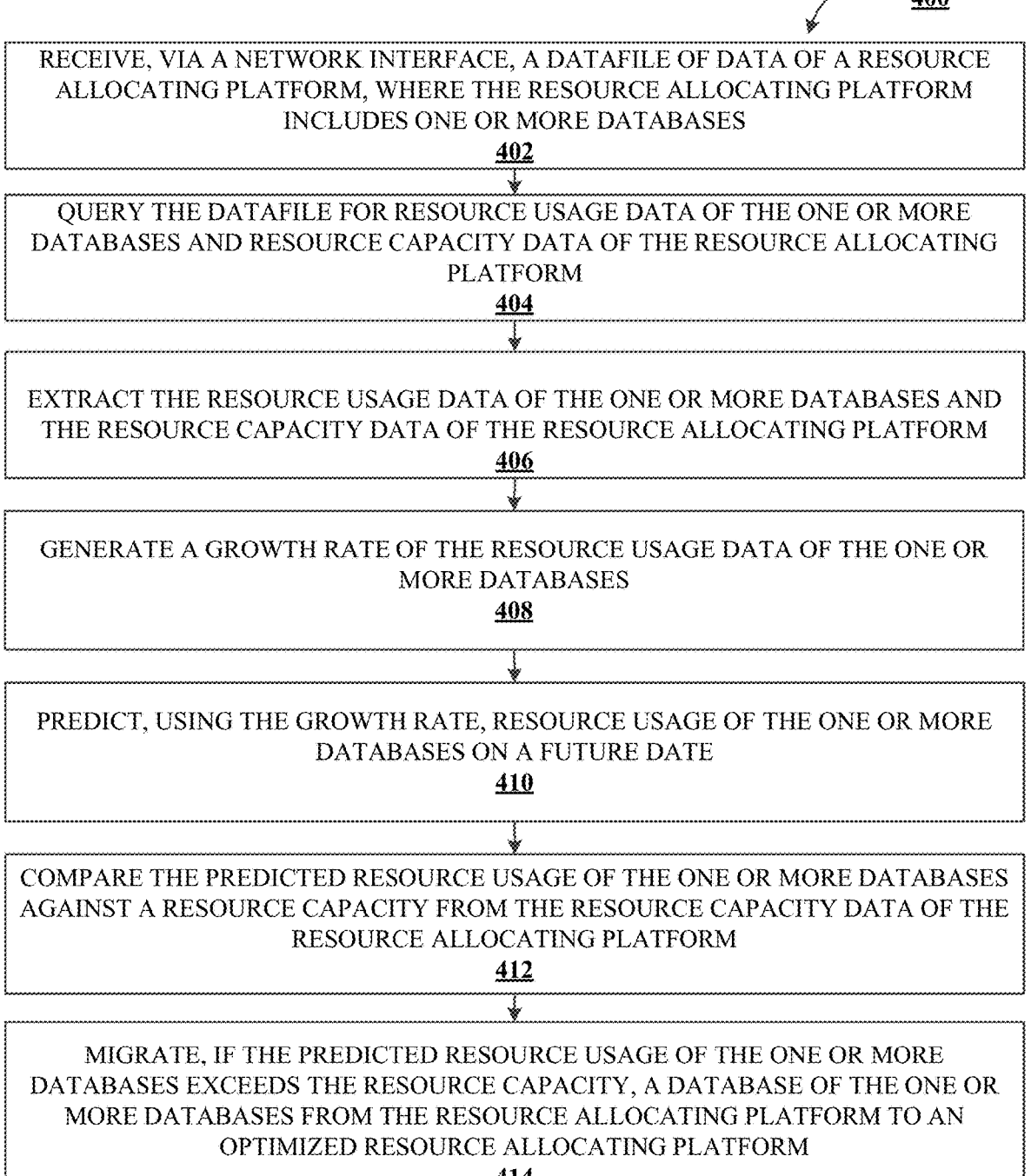

400

RECEIVE, VIA A NETWORK INTERFACE, A DATAFILE OF DATA OF A RESOURCE ALLOCATING PLATFORM, WHERE THE RESOURCE ALLOCATING PLATFORM INCLUDES ONE OR MORE DATABASES
402

QUERY THE DATAFILE FOR RESOURCE USAGE DATA OF THE ONE OR MORE DATABASES AND RESOURCE CAPACITY DATA OF THE RESOURCE ALLOCATING PLATFORM
404

EXTRACT THE RESOURCE USAGE DATA OF THE ONE OR MORE DATABASES AND THE RESOURCE CAPACITY DATA OF THE RESOURCE ALLOCATING PLATFORM
406

GENERATE A GROWTH RATE OF THE RESOURCE USAGE DATA OF THE ONE OR MORE DATABASES
408

PREDICT, USING THE GROWTH RATE, RESOURCE USAGE OF THE ONE OR MORE DATABASES ON A FUTURE DATE
410

COMPARE THE PREDICTED RESOURCE USAGE OF THE ONE OR MORE DATABASES AGAINST A RESOURCE CAPACITY FROM THE RESOURCE CAPACITY DATA OF THE RESOURCE ALLOCATING PLATFORM
412

MIGRATE, IF THE PREDICTED RESOURCE USAGE OF THE ONE OR MORE DATABASES EXCEEDS THE RESOURCE CAPACITY, A DATABASE OF THE ONE OR MORE DATABASES FROM THE RESOURCE ALLOCATING PLATFORM TO AN OPTIMIZED RESOURCE ALLOCATING PLATFORM
414

FIGURE 4

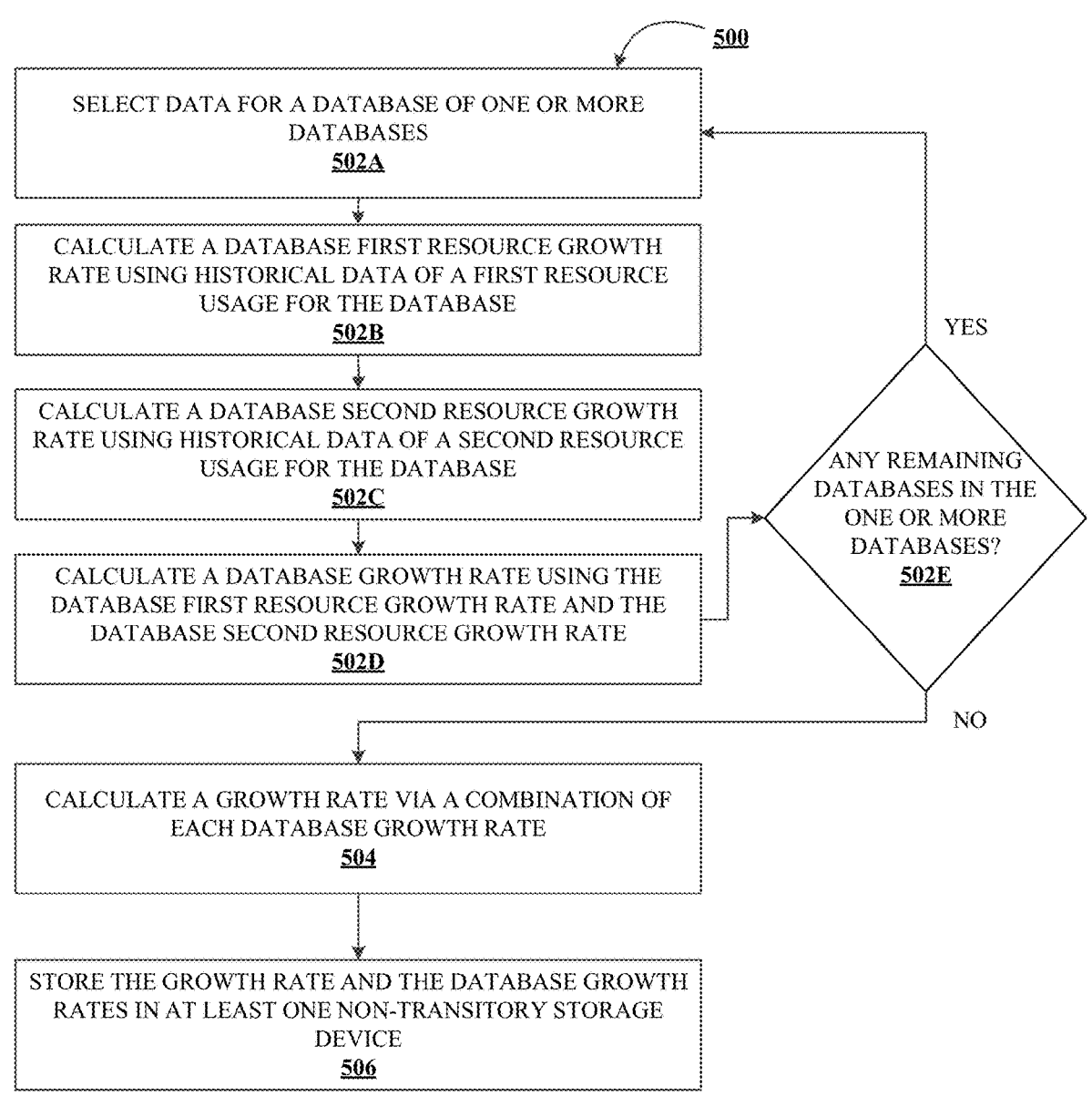

SELECT DATA FOR A DATABASE OF ONE OR MORE
DATABASES
502A

CALCULATE A DATABASE FIRST RESOURCE GROWTH
RATE USING HISTORICAL DATA OF A FIRST RESOURCE
USAGE FOR THE DATABASE
502B

CALCULATE A DATABASE SECOND RESOURCE GROWTH
RATE USING HISTORICAL DATA OF A SECOND RESOURCE
USAGE FOR THE DATABASE
502C

CALCULATE A DATABASE GROWTH RATE USING THE
DATABASE FIRST RESOURCE GROWTH RATE AND THE
DATABASE SECOND RESOURCE GROWTH RATE
502D

ANY REMAINING
DATABASES IN THE
ONE OR MORE
DATABASES?
502E

YES

NO

CALCULATE A GROWTH RATE VIA A COMBINATION OF
EACH DATABASE GROWTH RATE
504

STORE THE GROWTH RATE AND THE DATABASE GROWTH
RATES IN AT LEAST ONE NON-TRANSITORY STORAGE
DEVICE
506

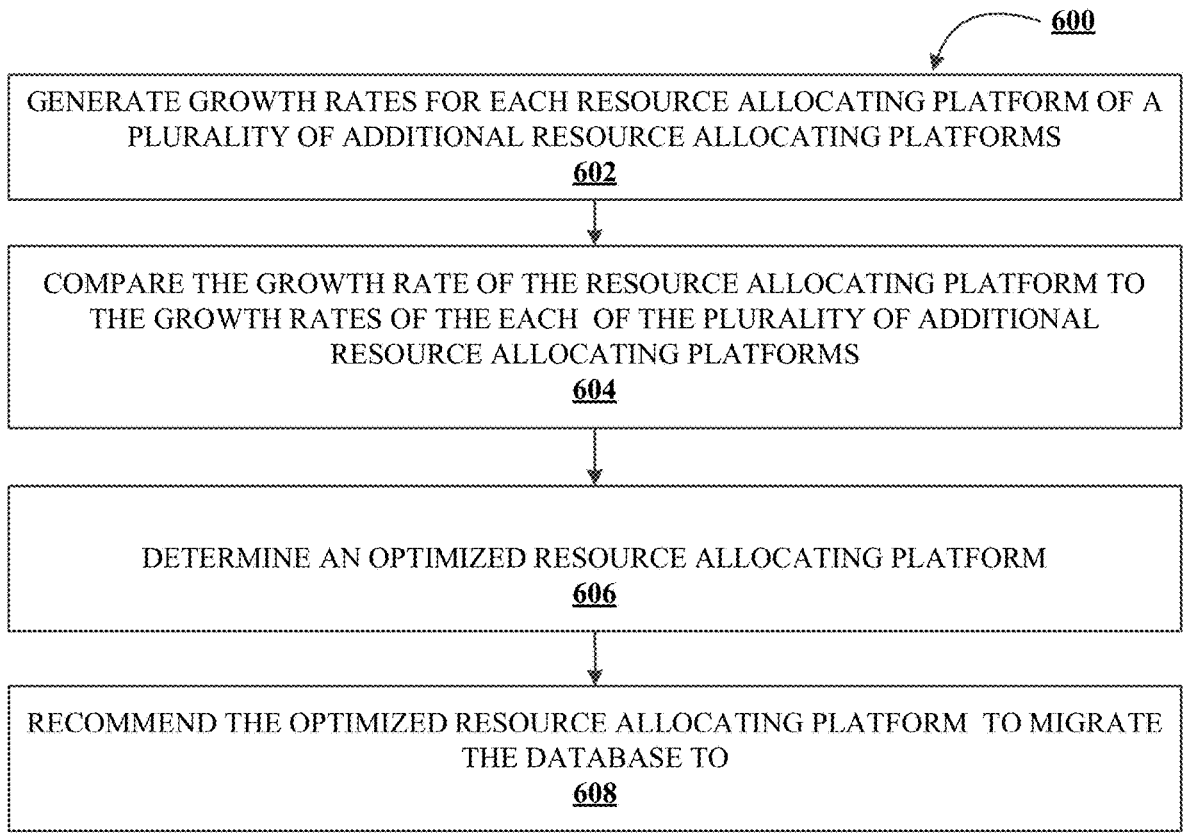

GENERATE GROWTH RATES FOR EACH RESOURCE ALLOCATING PLATFORM OF A
PLURALITY OF ADDITIONAL RESOURCE ALLOCATING PLATFORMS
602

COMPARE THE GROWTH RATE OF THE RESOURCE ALLOCATING PLATFORM TO
THE GROWTH RATES OF THE EACH OF THE PLURALITY OF ADDITIONAL
RESOURCE ALLOCATING PLATFORMS
604

DETERMINE AN OPTIMIZED RESOURCE ALLOCATING PLATFORM
606

RECOMMEND THE OPTIMIZED RESOURCE ALLOCATING PLATFORM TO MIGRATE
THE DATABASE TO
608

FIGURE 6

SYSTEMS AND METHODS FOR MANAGING DATABASE MIGRATION BASED PREDICTED RESOURCE USAGE

FIELD OF THE INVENTION

The present invention generally relates to database management and more specifically, managing database migration based on predicted resource usage.

BACKGROUND

Presently, resource allocation for new applications on existing resource allocating platforms requires manual identification of available resources. However, growth projections of existing applications is not factored into the available resources; thus, leading to a lack of resources for growth in existing applications and forced migration of applications due to the lack of resources.

Applicant has identified a number of deficiencies and problems associated with dynamic load placement with artificial intelligence growth projection. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic load placement with AI growth projection may include a network interface configured to communicate via a communication network, a non-transitory storage device including computer program code stored thereon, and a processing device operably coupled to the network interface and the non-transitory storage device. In some embodiments, the computer program code may include computer instructions configured to cause the processing device to receive, via the network interface, a datafile of data of a resource allocating platform, where the resource allocating platform includes one or more databases, query the datafile for resource usage data of the one or more databases and resource capacity data of the resource allocating platform, extract the resource usage data of the one or more databases and the resource capacity data of the resource allocating platform, generate a growth rate of the resource usage data of the one or more databases, predict, using the growth rate, resource usage of the one or more databases on a future date, compare the predicted resource usage of the one or more databases against a resource capacity from the resource capacity data of the resource allocating platform, and migrate, if the predicted resource usage of the one or more databases exceeds the resource capacity, a database of the one or more databases from the resource allocating platform to an optimized resource allocating platform.

In some embodiments, the data of the resource allocating platform of the datafile may include the resource capacity of the resource allocating platform, physical location data of the resource allocating platform, current resource usage for each of the one or more database, and historical data of the resource usage for each of the one or more databases. Additionally, and/or alternatively, the at least one non-transitory storage device may include computer-executable program code that, when executed by the at least one processing device, causes the at least one processing device to, when generating the growth rate of the resource usage data of the one or more database, for each database of the one or more databases, select data for a database of the one or more databases, calculate a database first resource growth rate using the historical data of a first resource usage for the database, calculate a database second resource growth rate using the historical data of a second resource usage for the database, and calculate a database growth rate using the database first resource growth rate and the database second resource growth rate. Further, the at least one non-transitory storage device may include computer-executable program code that, when executed by the at least one processing device, causes the at least one processing device to, when generating the growth rate of the resource usage data of the one or more database, calculate the growth rate via a combination of each database growth rate and store the growth rate and the database growth rates in the at least one non-transitory storage device.

In some embodiments, the at least one non-transitory storage device may include computer-executable program code that, when executed by the at least one processing device, causes the at least one processing device to, prior to migrating the database from the resource allocating platform to the optimized resource allocating platform, generate growth rates for each resource allocating platform of a plurality of additional resource allocating platforms, compare a growth rate of the resource allocating platform to the growth rates of the each of the plurality of additional resource allocating platforms, determine the optimized resource allocating platform, and recommend the optimized resource allocating platform to migrate the database to.

In some embodiments, the system may be configured to receive a request for a new database on the resource allocating platform, and the at least one non-transitory storage device may include computer-executable program code that, when executed by the at least one processing device, causes the at least one processing device to, when receiving the request, query the request for estimated resource usage for the new database, extract the estimated resource usage for the new database, predict, using the growth rate, resource usage of the one or more databases on a future date, calculate, via the predicted resource usage and the resource capacity, unused resources for the resource allocating platform on the future date, compare the unused resources to the estimated resource usage, determine, if the unused resources exceed the estimated resource usage, the new database may be compatible with the resource allocating platform, and determine, if the estimated resource usage exceeds the unused resources, the new database may not be compatible with the resource allocating platform.

In some embodiments, the at least one non-transitory storage device may include computer-executable program code that, when executed by the at least one processing device, causes the at least one processing device to, when determining the new database may not be compatible with the resource allocating platform, request datafiles of data on a plurality of resource allocating platforms, receive, via the network interface, the datafiles of data of the plurality of resource allocating platforms, for each datafile, generate a growth rate from resource usage data of one or more databases of a resource allocating platform of the plurality of resource allocating platforms, predict, using the growth rate, resource usage of the one or more databases of the resource allocating platform of the plurality of resource allocating platforms on the future date, calculate, via the predicted resource usage and a resource capacity of the resource allocating platform, unused resources for the resource allocating platform of the plurality of resource allocating platforms on the future date, and compare the unused resources to the estimated resource usage. Further, the at least one non-transitory storage device may include computer-executable program code that, when executed by the at least one processing device, causes the at least one processing device to, when determining the new database may not be compatible with the resource allocating platform, determine among resource allocating platforms of the plurality of resource allocating platforms with unused resources exceeding the estimated resource usage an optimized resource allocating platform, and transmit, via the network interface, a recommendation to build the new database on the optimized resource allocating platform.

In some embodiments, the at least one non-transitory storage device may include computer-executable program code that, when executed by the at least one processing device, causes the at least one processing device to, when querying the request for the new database, extract data from the request for the new database, where the extracted data includes resource usage data and database use data, analyze the extracted data, and predict, using the analysis of the extracted data, a growth rate for the new database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
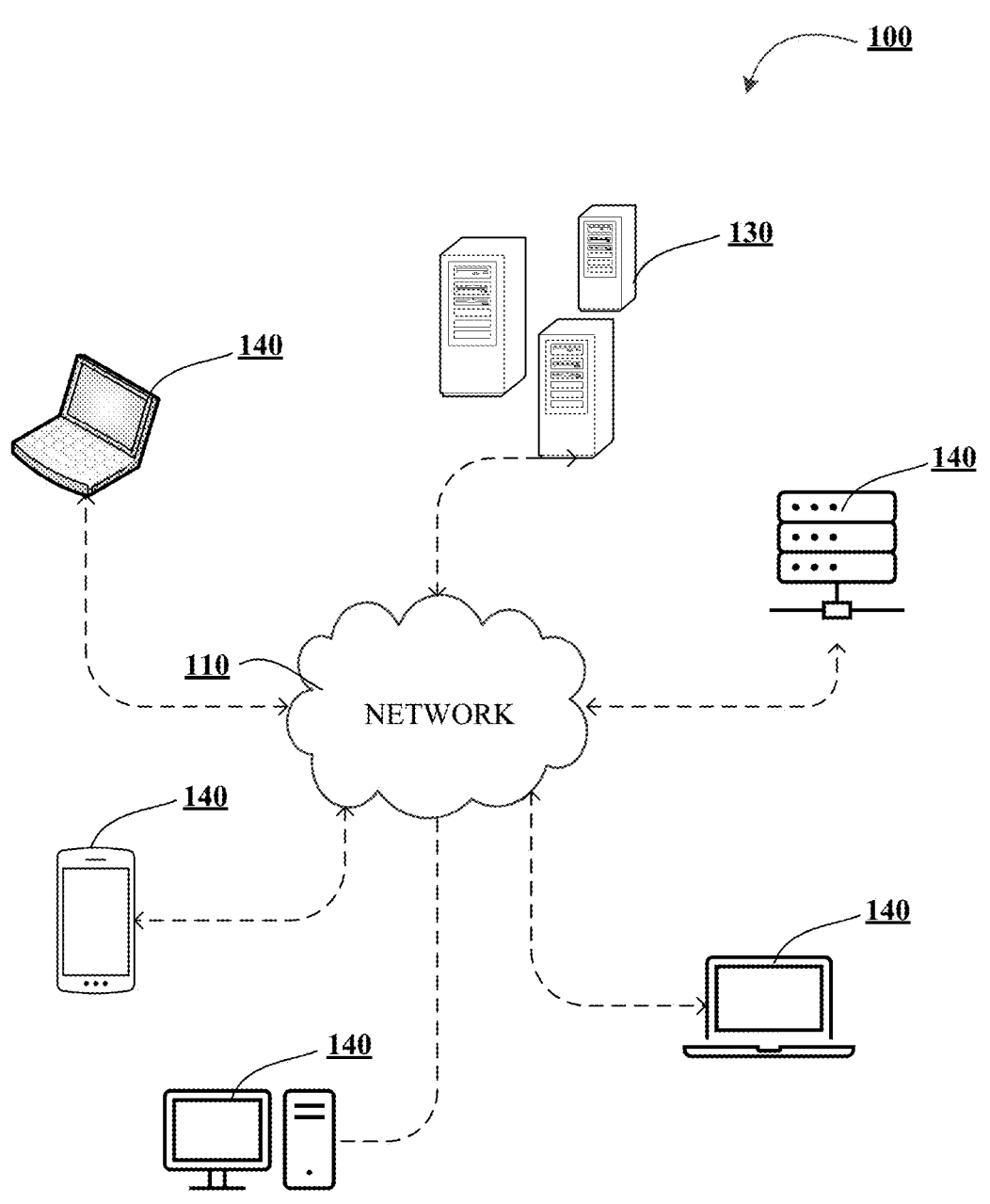
Figure 1B:
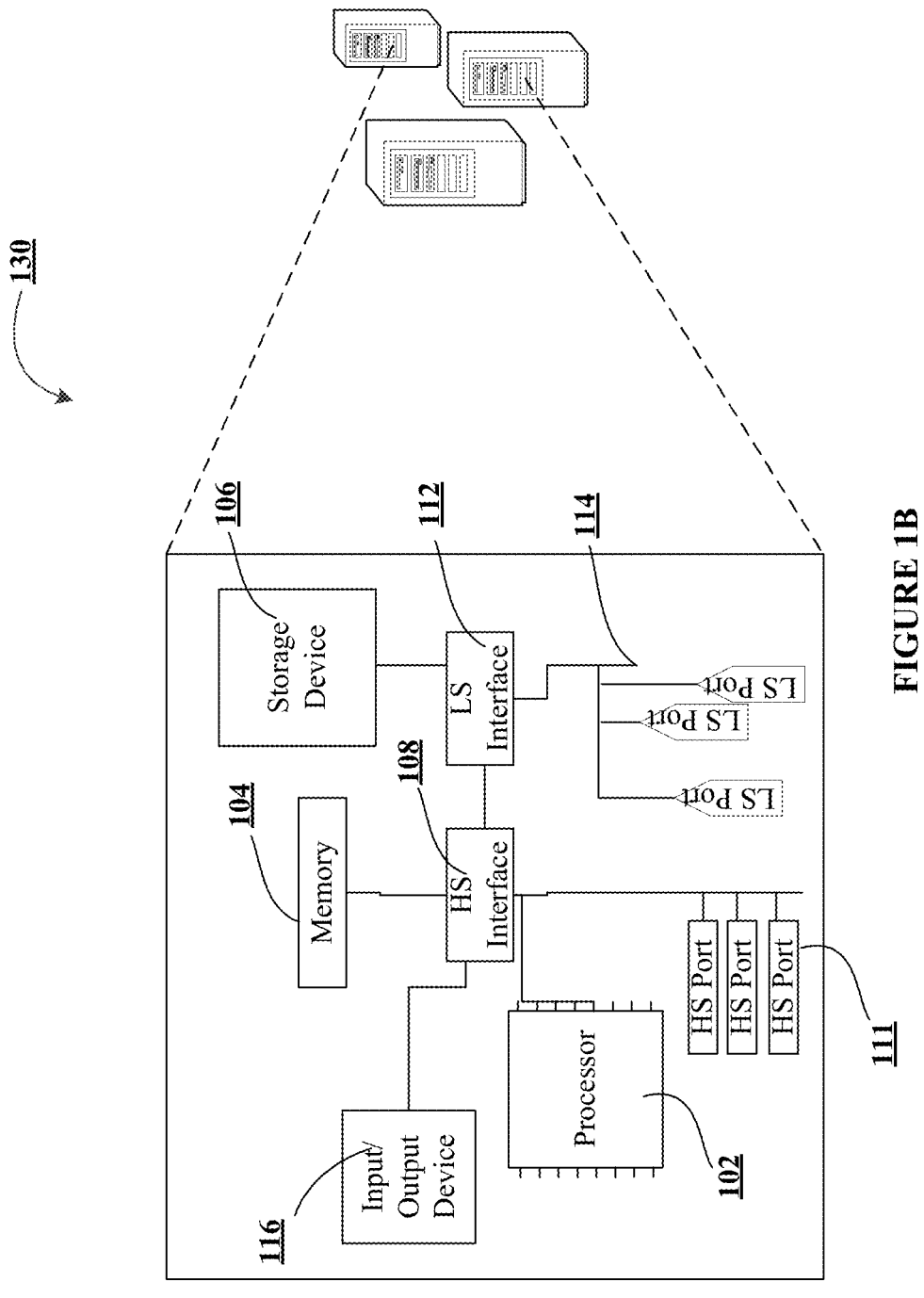
Figure 1C:
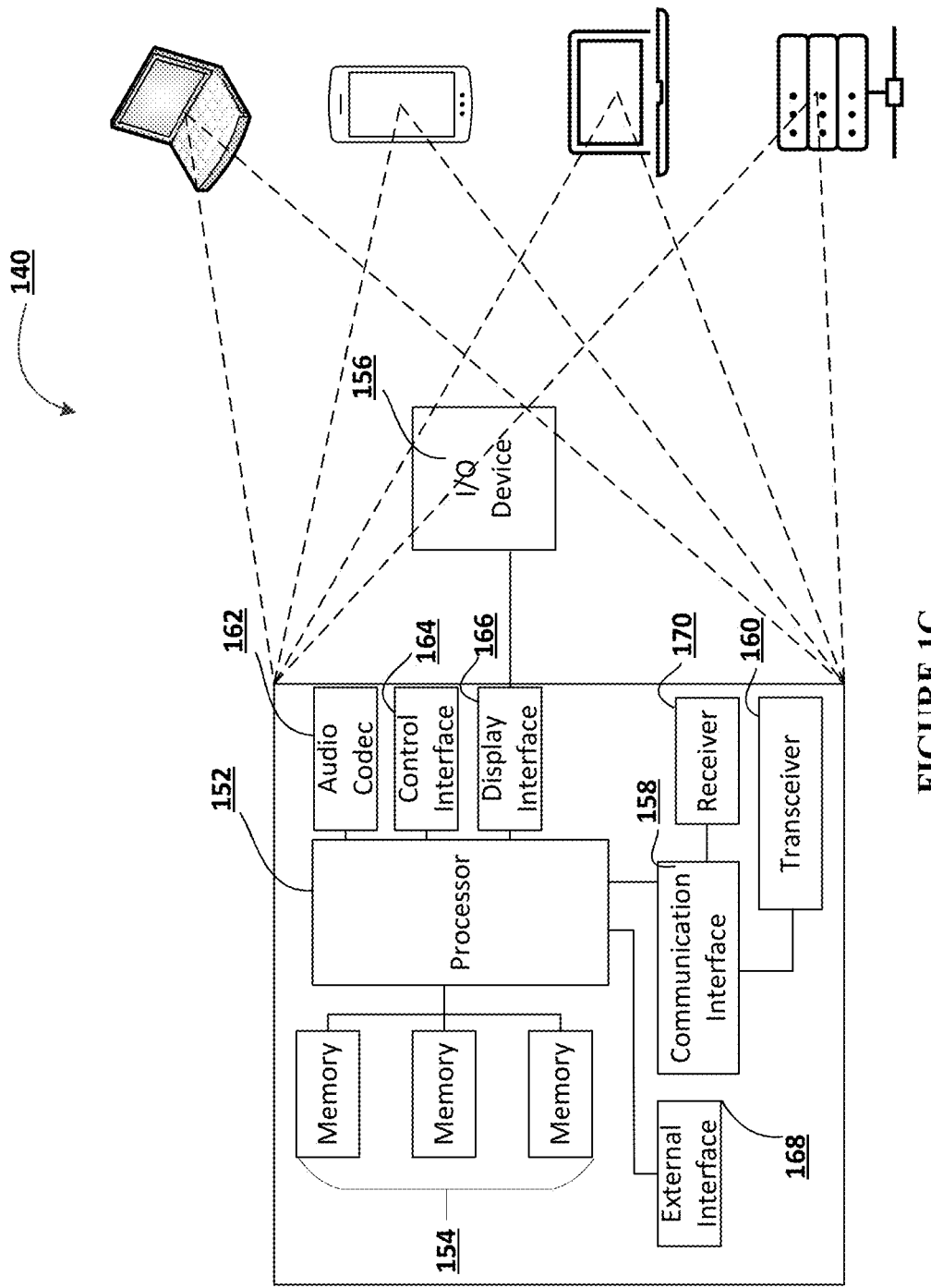
Figure 2:
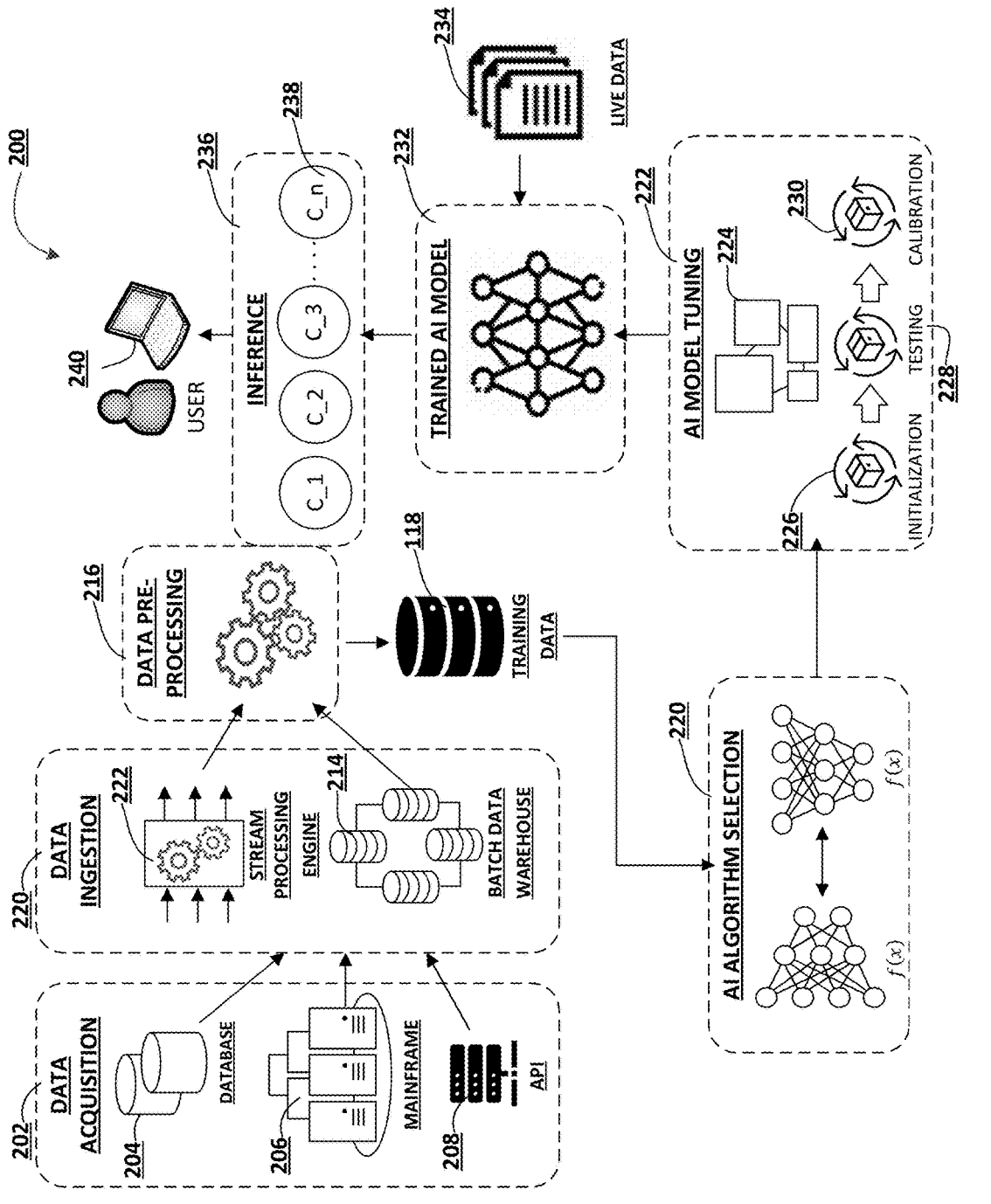
Figure 3:
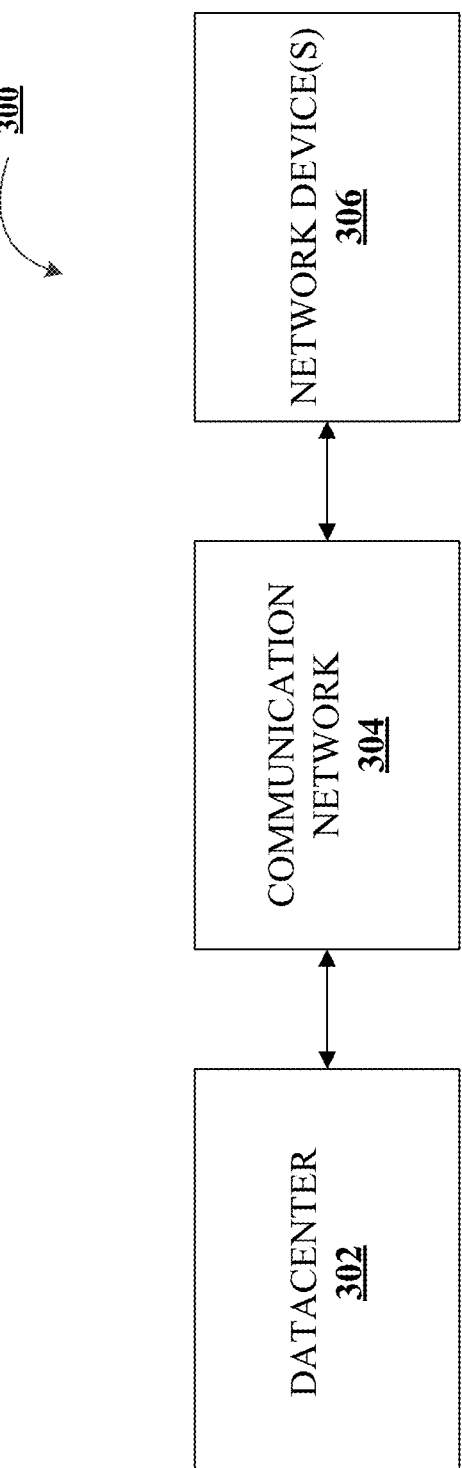
Figure 7:
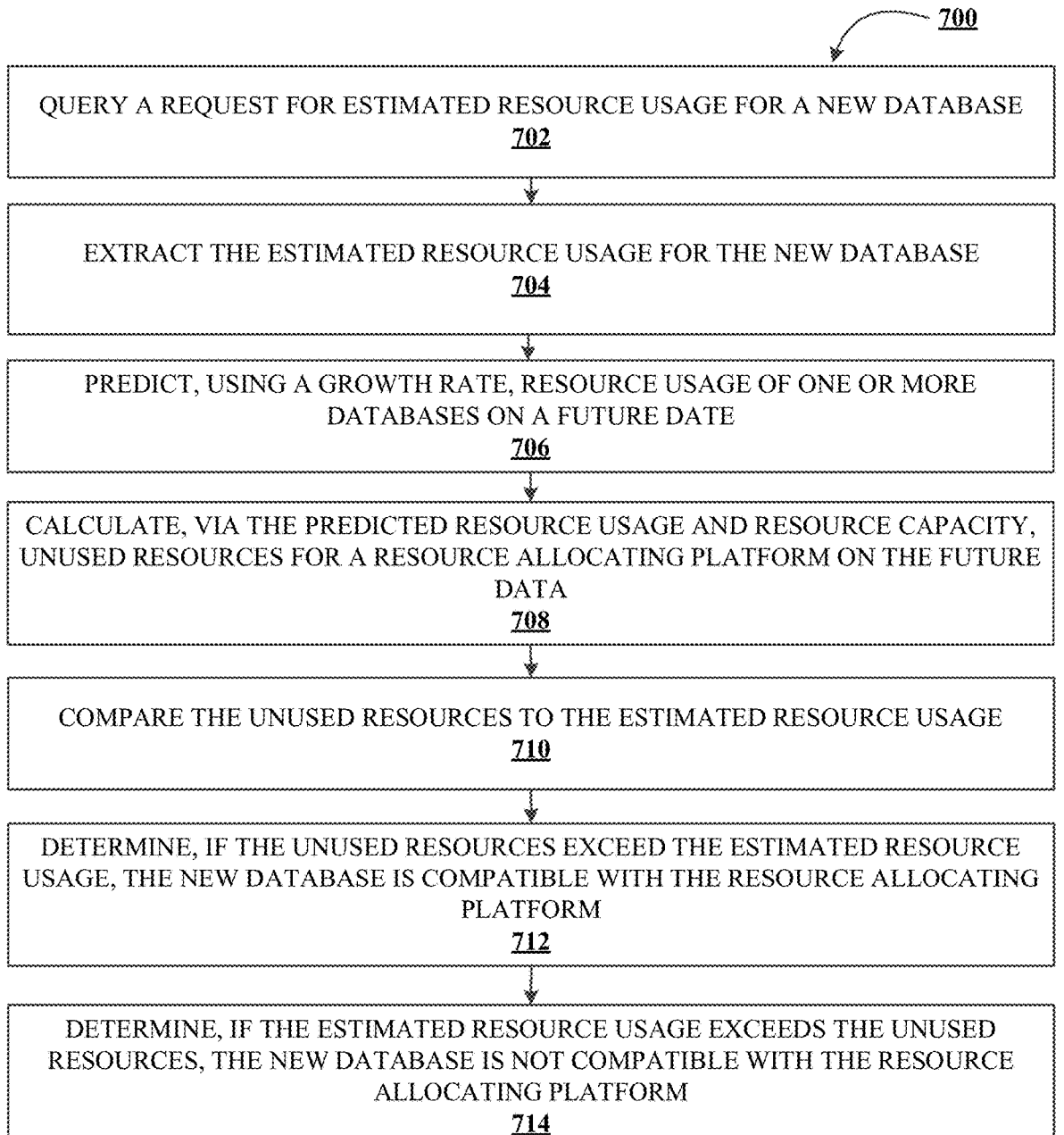
Figure 8:
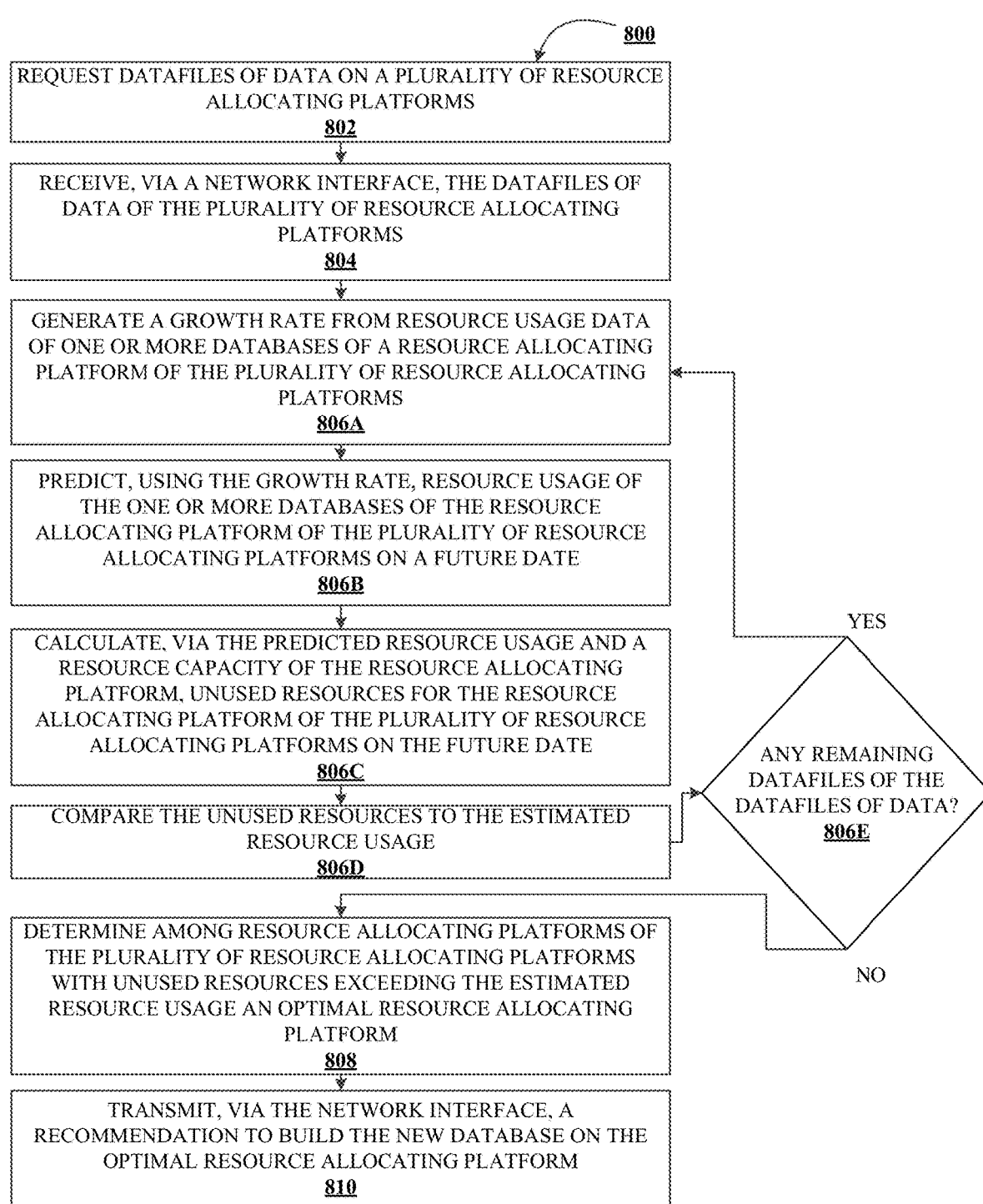
Figure 9:
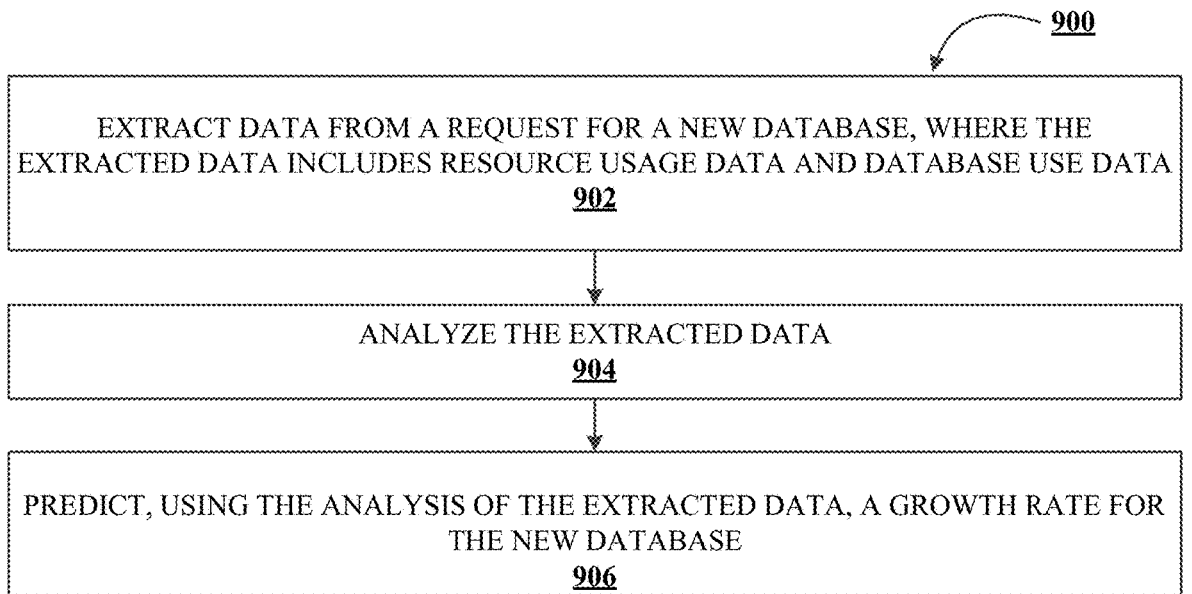

Having thus described embodiments of the invention in general terms, reference will now be made the accompanying drawings, wherein:

FIGS. 1A-1C illustrates technical components of an exemplary distributed computing environment for dynamic load placement with artificial intelligence growth projection, in accordance with an embodiment of the disclosure;

FIG. 2 illustrates an exemplary artificial intelligence (AI) engine subsystem architecture, in accordance with an embodiment of the disclosure;

FIG. 3 illustrates an example network architecture for dynamic load placement with artificial intelligence growth projection, in accordance with an embodiment of the disclosure;

FIG. 4 illustrates a process flow for dynamic load placement with artificial intelligence growth projection, in accordance with an embodiment of the disclosure;

FIG. 5 illustrates another process flow for dynamic load placement with artificial intelligence growth projection, in accordance with an embodiment of the disclosure;

FIG. 6 illustrates another process flow for dynamic load placement with artificial intelligence growth projection, in accordance with an embodiment of the disclosure;

FIG. 7 illustrates another process flow for dynamic load placement with artificial intelligence growth projection, in accordance with an embodiment of the disclosure;

FIG. 8 illustrates another process flow for dynamic load placement with artificial intelligence growth projection, in accordance with an embodiment of the disclosure; and FIG. 9 illustrates another process flow for dynamic load placement with artificial intelligence growth projection, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction," "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (e.g., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points or the like. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present disclosure provides a system for dynamic load placement with artificial intelligence growth projection. In an example embodiment, the invention discloses a system that may include an artificial intelligence (AI) model configured to receive data for a resource allocating platform. In such embodiments, the AI model may be configured to query and/or extract data including historical resource usage of one or more databases on the resource allocating platform from the received data. Further, the AI model may generate growth rates via analyzing the historical resource data. Using the generated growth rates, the AI model may, in some embodiments, predict the number of resources the one or more databases may require on a later date.

Presently, applications may require an associated database stored on a resource allocating platform. Further, resource allocation for new applications on existing resource allocating platforms requires manual identification of available resources. However, growth projections of existing applications are not factored into the available resources; thus, leading to a lack of resources for growth in existing applications and forced migration of applications due to the lack of resources.

Embodiments of the present disclosure provide for a system for dynamic load placement with artificial intelligence growth projection. In some embodiments, the system may leverage an AI model to analyze data including historical resource usage data for one or more databases on a resource allocating platform (e.g., a datacenter, cloud servers, and/or the like) for a plurality of resource allocating platforms. Further, the analysis of the AI model may yield growth rates for resources (e.g., a measure of how a resource usage changes over time) required by each of one or more databases on a resource allocating platform of the plurality for each of the plurality of resource allocating platforms.

In some embodiments, the system for dynamic load placement with artificial intelligence growth projection may be configured to use the calculated growth rates to predict resource usage on a later date for each of one or more databases of a resource allocating platform. Further, the AI model may predict if the required resources on a later date will exceed resource capacity of the resource allocating platform. Additionally, and/or alternatively, the AI model may be configured to predict, in the event of a new database being requested on the resource allocating platform, if the resource allocating platform will have sufficient resources to sustain the inclusion of the new database on a later date. In this way, embodiments of the present disclosure may maximize the utility generated by currently existing data by preemptively optimizing the distribution of databases across the plurality of resource allocating platforms.

Accordingly, the present invention may include a system, computer program, and/or method for dynamic load placement with artificial intelligence growth projection. Embodiments of the present disclosure may include an artificial intelligence (AI) model configured to receive and/or store historical data of a plurality of databases hosted on a resource allocating platform (e.g., a datacenter), analyze the historical data to generate growth rates for each database, predict, using the growth rates, resources used by each database of the resource allocating platform on a future date, and/or determine if a resource capacity of the resource allocating platform is sufficient to host a new database and/or the existing databases on the future date. In an example embodiment, the historical data may include resource usage data for each resource (e.g., volatile memory, nonvolatile memory, CPUs, and/or the like) used by a database on a resource allocating platform for previous dates. In such embodiments, the AI model may be configured to receive the historical data as input to generate growth rates (e.g., a measure of how a resource usage changes over time) for each resource for each database. Further, using the growth rates, the AI model may be configured to predict if the resource capacity for each resource of the resource allocating platform may be sufficient to sustain the current databases on the resource allocating platform and/or a new database on the resource allocating platform on a future date.

What is more, the present invention provides a technical solution to a technical problem. As described herein, the technical problem includes unoptimized distributions of databases across resource allocating platforms leading to a lack of resources for growth in existing applications and their associated databases; thus, increasing the amount of forced migration of applications due to the lack of resources.

The technical solution presented herein allows for a system for dynamic load placement with artificial intelligence growth projection that may preemptively optimize the distribution of existing and/or new databases across a plurality of resource allocating platforms. In particular, the system for dynamic load placement with artificial intelligence growth projection is an improvement over existing solutions to the unoptimized distributions of databases across resource allocating platforms, (i) with fewer steps to achieve the solution, thus reducing the amount of computing resources, such as processing resources, storage resources, network resources, and/or the like, that are being used (e.g., by using an AI model, the number of migrations due to lack of available resources on a resource allocation platform due to application growth may be reduced and/or minimized), (ii) providing a more accurate solution to problem, thus reducing the number of resources required to remedy any errors made due to a less accurate solution (e.g., by leveraging an AI model, errors in placing new databases and/or existing databases on a resource allocating platform that may not have the required resource capacity may be reduced and/or minimized), (iii) removing manual input and waste from the implementation of the solution, thus improving speed and efficiency of the process and conserving computing resources (e.g., by using predictive analytics from an AI model over manual decisions based on non-projective data, resource allocating platforms with sufficient long-term resources to host new and/or existing databases may be found quicker and/or the distribution of databases across a plurality of resource allocating platforms may be more efficient and/or optimized), (iv) determining an optimal amount of resources that need to be used to implement the solution, thus reducing network traffic and load on existing computing resources (e.g., by determining growth rates for each resource used by a database, databases can be platformed with other databases with contrasting growth rates for each resource; thus yielding, similar growth rates for each resource on a resource allocating platform). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of a system for dynamic load placement with artificial intelligence growth projection, in accordance with an embodiment of the invention. As shown in FIG. 1A, the distributed computing environment 100 contemplated herein may include a system 130 (e.g., a dynamic load placement system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, a multi-processor system, and/or the like).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, or the like) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICS (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. In some embodiments, the AI engine subsystem 200 may be included in a system (e.g., similar to the system 130 shown and described herein with respect to FIGS. 1A-1C, a dynamic load placement system, and/or the like). Additionally, or alternatively, the AI engine subsystem 200 may be a subsystem of another system (e.g., similar to the system 130 shown and described herein with respect to FIGS. 1A-1C) that is in communication with a tracing and securing resource distribution provided secondary entity access to user data (e.g., via a network similar to the network 110 as shown and described herein with respect to FIGS. 1A-1C). The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data required to be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, and/or the like), unsupervised learning (e.g., using an Apriori algorithm, using K-means clustering, and/or the like), semi-supervised learning, reinforcement learning (e.g., using a Q-learning algorithm, using temporal difference learning, and/or the like), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, Ada-Boost, stacked generalization, gradient boosting machine method, random forest method, and/or the like), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2$ . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1$, $C\_2$ . . . $C\_n$ 238) live data 234 based on how similar they are to one another to solve exploratory challenges where little is known about the data, provide a description or label (e.g., $C\_1$, $C\_2$ . . . $C\_n$ 238) to live data 234, such as in classification, and/or the like. These categorized outputs, groups (clusters), or labels are then presented to the system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates an example network architecture 300, in accordance with an embodiment of the disclosure. As shown in FIG. 3, the network architecture 300 may include a datacenter 302, a communication network 304, and network device(s) 306. It is to be understood that the network architecture 300 may depict the general computing architecture within which more specific systems and/or subsystems may function. The network architecture 300 may provide a broad, abstract representation of the overall infrastructure, allowing for the inclusion of various configurations and implementations of the individual components without limiting the scope of the disclosure. In some embodiments, the network architecture 300 may be included in a system (e.g., similar to the system 130 shown and described herein with respect to FIGS. 1A-IC, a dynamic load placement system, and/or the like).

The datacenter 302 may be a centralized facility designed to house computing resources and related components. The primary function of the datacenter 302 may be to support the infrastructure required for advanced computational tasks, for efficient, secure, and reliable operations. The datacenter 302 may include building and structural components, including power supplies, cooling systems, fire suppression systems, and physical security measures that are configured to maintain optimal operating conditions and protect the equipment from environmental hazards and unauthorized access. At its core, the datacenter 302 may include high-performance servers or compute nodes, often arranged in racks, and connected through high-speed networks. These servers may include processors (e.g., central processing units (CPUs), graphics processing units (GPUs), and/or the like), memory (e.g., RAM), and storage solutions (e.g., hard disk drives (HDDs), solid state drives (SSDs), and/or the like. The hardware configuration may be optimized for parallel processing and high throughput, catering to the demands of high-performance computing (HPC) applications.

The datacenter 302 may include high-speed network equipment, such as network switches, routers, firewalls, and/or the like to facilitate fast and secure data transmission within the datacenter 302 (e.g., between the servers or compute nodes) and between external networks. The datacenter 302 may facilitate communication between servers or compute nodes through a network topology that ensures efficient data exchange, minimizes latency, and maximizes bandwidth. The network topology may dictate how various network devices, such as switches and routers, are interconnected for data flow. By implementing an effective network topology, the datacenter 302 can support high-performance computing tasks. Examples of various network topologies may include hierarchical networking topologies such as the fat tree topology, Slim Fly topology, Dragonfly topology, and/or the like.

The communication network 304 may operatively couple the datacenter 302 to network device(s) 306 and other external devices for data exchange and connectivity. Examples of communication network 304 include an Internet Protocol (IP) network, an Ethernet network, an Infini-Band (IB) network, a Fibre Channel network, the Internet, a cellular communication network, a wireless communication network, combinations thereof (e.g., Fibre Channel over Ethernet), variants thereof, and/or the like. Each type of network offers specific advantages tailored to different operational requirements. For instance, an IP network or Ethernet network may provide widespread compatibility and case of integration, supporting various protocols and applications across the datacenter 302 and the network device(s) 306 (and/or external devices). An InfiniBand network may offer high throughput and low latency, ideal for HPC environments where rapid data transfer and minimal delay are required. Fibre Channel networks may be employed for their robust performance in storage area networks (SANs), ensuring fast and reliable access to storage resources. Cellular and wireless communication networks may be used to extend connectivity to remote or mobile devices for increased flexibility and accessibility. The ability of the communication network 304 to incorporate multiple network types and configurations allows the datacenter 302 to adapt to diverse application needs, from general data communication to specialized HPC tasks.

The network device(s) 306 may include a variety of computing devices capable of transmitting and receiving signals over the communication network 304. The network device(s) 306 can range from personal computing devices to complex server configurations. Examples include Personal Computers (PCs), laptops, tablets, smartphones, and servers. The network device(s) 306 may facilitate user interactions with the datacenter 302, allowing for data input, retrieval, and processing from remote locations. In addition to individual computing devices, the network device(s) 306 may also include collections of servers or additional datacenters. For instance, these could be other datacenters similar to or the same as datacenter 302. Such an interconnection may allow for the formation of a distributed computing environment for improved redundancy, load balancing, and disaster recovery capabilities. By linking multiple datacenters, the network architecture 300 can leverage geographically dispersed resources, optimizing performance and ensuring high availability.

As described herein, the datacenter 302 and/or the network device(s) 306 may include storage devices and processing circuitry for executing computing tasks, such as controlling the flow of data internally and over the communication network 304. The processing circuitry may comprise software, hardware, or a combination thereof. For example, the processing circuitry may include a memory containing executable instructions and a processor (e.g., a microprocessor) that executes these instructions. The memory may correspond to any suitable type of memory device or collection of memory devices configured to store instructions. Non-limiting examples of suitable memory devices include Flash memory, Random Access Memory (RAM), Read Only Memory (ROM), variants thereof, combinations thereof, or similar technologies. In specific embodiments, the memory and processor may be integrated into a common device, such as a microprocessor with integrated memory. Additionally, or alternatively, the processing circuitry may comprise hardware components, such as an application-specific integrated circuit (ASIC). Other non-limiting examples of processing circuitry include Integrated Circuit (IC) chips, CPUs, GPUS, microprocessors, Field Programmable Gate Arrays (FPGAs), collections of logic gates or transistors, resistors, capacitors, inductors, and diodes. Some or all of the processing circuitry may be provided on a Printed Circuit Board (PCB) or a collection of PCBs. It should be appreciated that any appropriate type of electrical component or collection of electrical components may be suitable for inclusion in the processing circuitry.

In addition, although not explicitly shown, it should be appreciated that the datacenter 302 and network device(s) 306 may include one or more communication interfaces for facilitating wired and/or wireless communication between one another and other unillustrated elements of the network architecture 300. These communication interfaces may include a variety of technologies, including but not limited to Ethernet ports, fiber optic connections, Wi-Fi® transceivers, Bluetooth® modules, and cellular communication modules for integration and interoperability among the various components within the network architecture 300.

Furthermore, it should be understood that the network architecture 300 may include additional components and functionalities within the scope of the present disclosure. These components may comprise, without limitation, additional processing units, specialized accelerators (such as Tensor Processing Units or TPUs), enhanced security modules, and redundant power supplies. The inclusion of these elements is intended to ensure that the network architecture 300 is robust, scalable, and capable of meeting diverse operational requirements. Any variations, modifications, or adaptations of the described elements that fall within the spirit and scope of the disclosure are considered to be encompassed by the present disclosure. This includes any combinations, sub-combinations, or enhancements of the various described elements to achieve improved performance, reliability, and efficiency in the network architecture 300.

FIG. 4 illustrates a process flow 400 for dynamic load placement with artificial intelligence growth projection, in accordance with an embodiment of the disclosure. In some embodiments, a system (e.g., similar to one or more of the systems shown and described herein with respect to FIGS. 1A-1C) may perform one or more of the steps of process flow 400. For example, a dynamic load placement with artificial intelligence growth projection system (e.g., similar to the system 130 shown and described herein with respect to FIGS. 1A-1C) may perform one or more of the steps of process flow 400. In some embodiments, an artificial intelligence engine (e.g., similar to the AI engine subsystem 200 as shown and described herein with respect to FIG. 2) may perform one or more of the steps of process flow 400. In some embodiments, a datacenter (e.g., similar to the datacenter 302 as shown and described herein with respect to FIG. 3) may perform one or more of the steps of process flow 400.

As shown in block 402, the process flow 400 may include the step of receiving, via a network interface, a datafile (e.g., structured datafiles, unstructured datafiles, multimedia datafiles, and/or the like) of data of a resource allocating platform, wherein the resource allocating platform includes one or more databases. In some embodiments, the data of the datafile of a resource allocating platform may include current resource usage data for each database of the resource allocating platform, historical resource usage data for each database of the resource allocating platform, location data of the resource allocating platform, resource capacity of the resource allocating platform, and/or the like. Additionally, and/or alternatively, resources used by a database and/or resources provided by a resource allocating platform may include nonvolatile memory, volatile memory, central processing units (CPUs), network bandwidth, power, heat dissipation, and/or the like. In such embodiments, prior to receiving the datafile of data, the datafile may be prepared, segmented and/or encapsulated into packets with headers, transmitted as signals (e.g., optical, electronic, digital, and/or the like) over a network, received by the network interface, and/or reassembled and/or processed by the process flow 400.

As shown in block 404, the process flow 400 may include the step of querying the datafile for resource usage data of the one or more databases and resource capacity data of the resource allocating platform. In some embodiments, the datafile may include information including the usage over a time period of each resource type provided by the resource allocating platform for each database hosted on the resource allocating platform and the capacity of each resource type provided by the resource allocating platform. In such embodiments, querying the datafile may include discerning the structure of the datafile, loading data of the datafile into memory (e.g., the memory 104 as shown and described herein with respect to FIGS. 1A-1C), preparing and/or executing a query to select and/or aggregate data from the datafile, and/or processing the data.

As shown in block 406, the process flow 400 may include the step of extracting the resource usage data of the one or more databases and the resource capacity data of the resource allocating platform. In some embodiments, the datafile may include information including the usage over a time period of each resource type provided by the resource allocating platform for each database of the one or more databases hosted on the resource allocating platform and the capacity of each resource type provided by the resource allocating platform. Further, the datafile may include a plurality of additional data that may be not directed to resource usage data of the one or more databases and the resource capacity data of the resource allocating platform. In such embodiments, after querying the datafile, the resource usage data and the resource capacity data may be additionally formatted, validated, post-processed, and/or stored in memory (e.g., volatile memory, nonvolatile memory, and/or the like).

As shown in block 408, the process flow 400 may include the step of generating a growth rate from the analysis of the resource usage data of the one or more databases. In some embodiments, the resource usage data may include historical resource usage data (e.g., an amount of each resource type used on prior dates). Further, the historical resource usage data may be used to calculate a measure of variance in a resource over time. For example, a first resource used by a database may have a first percentage increase between a first prior date and a second prior date. Further, the first resource may have a second percentage increase between the second prior date and a third prior date. Additionally, and/or alternatively, this process may be repeated for each date up to the present day. In this way, the growth rate may be calculated for the resource usage data of the one or more databases. In some embodiments, the growth rates may be generated from calculations using one or more formulas (e.g., $$\left(\frac{X_f - X_i}{X_i}\right) * 100, \left(\frac{X_f}{X_i}\right)^{\frac{1}{n}} - 1, \frac{r_1 + r_2 + \dots + r_n}{n},$$

and/or the like). In some embodiments, the growth rate may include a single growth rate for a single resource, a single growth rate for a plurality of resources, and/or a plurality of growth rates for a plurality of resources.

As shown in block 410, the process flow 400 may include the step of predicting, using the growth rate, resource usage of the one or more databases on a future date. In some embodiments, after the growth rate has been generated, a prediction of resource usage of one or more resources of the one or more databases on the future date may be made. In such embodiments, the overall resource usage of some and/or all of the resource types of the resource allocating platform may be found on the future date. For example, the generated growth rate for a first resource usage, the current first resource usage, and/or the future date may be input into a growth model (e.g., a linear growth model, an exponential growth model, a logistic growth model, and/or the like) and the calculation of the model with the input parameters may be performed; thus, calculating a predicted value for the first resource usage on the future date. In some embodiments, resource usage of the one or more resources may be dependent on resource usage of another resource usage of the one or more resource. Stated differently, when calculating the prediction for a resource usage of the one or more resources on the future date, the growth model may use data of one or more other resource usages of the one or more resources (e.g., growth rates, current resource usage, and/or the like of other resources) as inputs to the model. Additionally, and/or alternatively, resource usage of the one or more resources may be independent of resource usage of another resource usage of the one or more resource.

As shown in block 412, the process flow 400 may include the step of comparing the predicted resource usage of the one or more databases against a resource capacity from the resource capacity data of the resource allocating platform. In some embodiments, the datafile of data for the resource allocating platform may include the resource capacity data including the resource capacity (e.g., the highest amount for each resource the resource allocating platform may sustain) for the resource allocating platform. Further, for each predicted resource usage of the one or more resources of the one or more databases, the respective resource capacity may be compared against the predicted resource usage to evaluate if the predicted resource usage exceeds the respective resource capacity. In such embodiments, if at least one predicted resource usage of at least one database exceeds the respective resource capacity of the resource allocating platform, a database of the one or more databases of the resource allocating platform may be flagged for migration (e.g., transfer of a database to another resource allocating platform). In some embodiments, a database of the resource allocating platform may be flagged for purging rather than migration if the database is no longer in use and/or is redundant of another database.

As shown in block 414, the process flow 400 may include the step of migrating, if the predicted resource usage of the one or more databases exceeds the resource capacity, a database of the one or more databases from the resource allocating platform to another resource allocating platform. In some embodiments, to prevent exceeding the resource capacity of the resource allocating platform, a database may be migrated to the other resource allocating platform. Further, reasons to migrate the database of the one or more databases chosen for migration may include, location of an associated application, growth rates of one or more of the resources of the database, the current amount of resource usage of one or more of the resources of the database, and/or the like. Said differently, the database chosen for migration may be picked to optimize the resource usage across associated resource allocating platforms. Similarly, the other resource allocating platform chosen to receive the migrating database may be picked to optimize the resource usage across the associated resource allocating platforms.

The process flow 400 may include additional embodiments, such as any single embodiment or any combination of embodiments described herein. Although FIG. 4 shows example blocks of the process flow 400, in some embodiments, the process flow 400 may include additional blocks, fewer blocks, different blocks, or differently arranged blocks than those depicted in FIG. 4. Additionally, or alternatively, two or more of the blocks of the process flow 400 may be performed in parallel.

FIG. 5 illustrates a process flow 500 for dynamic load placement with artificial intelligence growth projection, in accordance with an embodiment of the invention. In some embodiments, a system (e.g., similar to one or more of the systems shown and described herein with respect to FIGS. 1A-1C) may perform one or more of the steps of process flow 500. For example, a dynamic load placement with artificial intelligence growth projection system (e.g., similar to the system 130 shown and described herein with respect to FIGS. 1A-1C) may perform the steps of process flow 500. In some embodiments, an artificial intelligence engine (e.g., such as the AI engine subsystem 200 as shown and described herein with respect to FIG. 2) may perform one or more of the steps of process flow 500. In some embodiments, a datacenter (e.g., similar to the datacenter 302 as shown and described herein with respect to FIG. 3) may perform one or more of the steps of process flow 500.

In some embodiments, and as shown in block 502A, the process flow 500 may include the step of selecting data for a database of the one or more databases. In some embodiments, the datafile of data for the resource allocating platform may include data for each database of the one or more databases on the resource allocating platform. Further, the data for each database may include current resource usage data and/or historical resource usage data of each database. In such embodiments, when generating resource usage growth rates for a database of the one or more databases of the resource allocating platform, the data pertaining to the database may be selected and/or extracted from the datafile of data. In some embodiments, the step of block 502A may follow the step of block 406 as shown and described herein with respect to FIG. 4 and/or may follow the step of block 502E as shown and described herein with respect to FIG. 5.

In some embodiments, and as shown in block 502B, the process flow 500 may include the step of calculating a database first resource growth rate using the historical data of a first resource usage for the database. In some embodiments, the resource usage data for the database may include data on a plurality of resources used by the database (e.g., a first resource, a second resource, a third resource, . . . , and/or an $n^{th}$ resource). In such embodiments, the database first resource growth rate may be calculated (e.g., by the step of block 408 as shown and described herein with respect to FIG. 4).

In some embodiments, and as shown in block 502C, the process flow 500 may include the step of calculating a database second resource growth rate using the historical data of a second resource usage for the database. In some embodiments, the resource usage data for the database may include data on a second resource used by the database. In such embodiments, the database second resource growth rate may be calculated (e.g., by the step of block 408 as shown and described herein with respect to FIG. 4).

In some embodiments, and as shown in block 502D, the process flow 500 may include the step of calculating a database growth rate using the database first resource growth rate and the database second resource growth rate. In some embodiments, the database growth rate (e.g., a measure of growth of all resources for the database) may be generated via a calculation performed on the database first resource growth rate and the database second resource growth rate (e.g., an average, a weighted average, a geometric mean, a compound rate, and/or the like). Additionally, and/or alternatively, a plurality of additional resources used by the database may have growth rates generated and/or may be included in the database growth rate calculation.

In some embodiments, and as shown in block 502E, the process flow 500 may include the step of determining if there are any remaining databases in the one or more databases. In some embodiments, the resource allocating platform may include a plurality of databases hosted on the resource allocating platform. In such embodiments, when predicting the resource usage on a future date, the resource usage of each database of the plurality of databases may be predicted. In some embodiments, the step of block 502E may be followed by, if there are databases remaining to have database growth rates calculated for, the step of block 502A as shown and described herein with respect to FIG. 5. Additionally, and/or alternatively, the step of block 502E may be followed by, if there are no databases remaining to have database growth rates calculated for, the step of block 504 as shown and described herein with respect to FIG. 5.

In some embodiments, and as shown in block 504, the process flow 500 may include the step of calculating the growth rate via a combination of each database growth rate. In some embodiments, after a database growth rate is calculated for each database of the resource allocating platform, the growth rate for a resource allocating platform may be generated. In such embodiments, the growth rate may be generated by a calculation combining each database growth rate (e.g., a summation, an average, a weighted average, a geometric mean, a compound rate, and/or the like). In some embodiments, growth rates for each resource may be treated separately from growth rates of other resources. Said differently, the process flow 500 may not include the step of block 502D and may generate growth rates for individual resources of the resource allocating platform.

In some embodiments, and as shown in block 506, the process flow 500 may include the step of storing the growth rate and the database growth rates in at least one non-transitory storage device. In some embodiments, the growth rate and the database growth rates may be stored a future use and/or calculation. Further, the growth rate and the database growth rates may be stored temporarily and/or indefinitely (e.g., in nonvolatile memory, volatile memory, and/or the like).

The process flow 500 may include additional embodiments, such as any single embodiment or any combination of embodiments described herein. Although FIG. 5 shows example blocks of the process flow 500, in some embodiments, the process flow 500 may include additional blocks, fewer blocks, different blocks, or differently arranged blocks than those depicted in FIG. 5. Additionally, or alternatively, two or more of the blocks of the process flow 500 may be performed in parallel.

FIG. 6 illustrates a process flow 600 for dynamic load placement with artificial intelligence growth projection, in accordance with an embodiment of the invention. In some embodiments, a system (e.g., similar to one or more of the systems shown and described herein with respect to FIGS. 1A-1C) may perform one or more of the steps of process flow 600. For example, a dynamic load placement with artificial intelligence growth projection system (e.g., similar to the system 130 shown and described herein with respect to FIGS. 1A-1C) may perform the steps of process flow 600. In some embodiments, an artificial intelligence engine (e.g., such as the AI engine subsystem 200 as shown and described herein with respect to FIG. 2) may perform one or more of the steps of process flow 600. In some embodiments, a datacenter (e.g., similar to the datacenter 302 as shown and described herein with respect to FIG. 3) may perform one or more of the steps of process flow 600.

In some embodiments, and as shown in block 602, the process flow 600 may include the step of generating growth rates for each resource allocating platform of a plurality of additional resource allocating platforms. In some embodiments, a resource allocating platform may have additional resource allocating platforms the resource allocating platform is associated with (e.g., the resource allocating platforms may be owned and/or used by the same entity). In such embodiments, growth rates for each resource allocating platform of the plurality of additional resource allocating platforms may be calculated (e.g., by performing some of and/or all of the steps of process flow 500 as shown and described herein with respect to FIG. 5).

In some embodiments, and as shown in block 604, the process flow 600 may include the step of comparing the growth rate of the resource allocating platform to the growth rates of the plurality of additional resource allocating platforms. In some embodiments, each resource allocating platform may include a different set of databases compared to other resource allocating platforms. In such embodiments, the resources used by the set of databases on each resource allocating platform may differ between each resource allocating platform. Additionally, and/or alternatively, the growth rate of the resource allocating platform may be compared against each growth rate of the plurality of additional resource allocating platforms to determine differences between growth rates. In some embodiments, growth rates for individual resources for the resource allocating platform may be compared against respective growth rates for individual resource for each additional resource allocating platform. Additionally, and/or alternatively, database growth rates for the resource allocating platform may be compared against database growth rates for each additional resource allocating platform.

In some embodiments, and as shown in block 606, the process flow 600 may include the step of determining, an optimized resource allocating platform. In some embodiments, the determination of the optimized resource allocating platform may include using the comparison of the step of block 604, comparing the physical location data of the resource allocating platforms, comparing the resource capacity of the resource allocating platform, and/or the like. Additionally, and/or alternatively, the aforementioned inclusions to the determination of the optimized resource allocating platform may be input into a model to calculate the optimal resource allocating platform. In such embodiments, the inputs to the model may be subject to standardization, normalization, weights, numerical encoding, feature engineering, and/or the like prior to use in the model.

In some embodiments, and as shown in block 608, the process flow 600 may include the step of recommending the optimized resource allocating platform as the other resource allocating platform to migrate the database to. In some embodiments, a resource allocating platform of the additional resource allocating platforms may be determined to be a more optimal hosting location for an existing and/or new database over the resource allocating platform. In such embodiments, a recommendation (e.g., a notification, a document, a datafile, an alert, and/or the like including the optimized resource allocating platform) may be generated and may be transferred to another system, a subsystem, a model, a user, a developer, an entity, and/or the like.

The process flow 600 may include additional embodiments, such as any single embodiment or any combination of embodiments described herein. Although FIG. 6 shows example blocks of the process flow 600, in some embodiments, the process flow 600 may include additional blocks, fewer blocks, different blocks, or differently arranged blocks than those depicted in FIG. 6. Additionally, or alternatively, two or more of the blocks of the process flow 600 may be performed in parallel.

FIG. 7 illustrates a process flow 700 for dynamic load placement with artificial intelligence growth projection, in accordance with an embodiment of the invention. In some embodiments, a system (e.g., similar to one or more of the systems shown and described herein with respect to FIGS. 1A-1C) may perform one or more of the steps of process flow 700. For example, a dynamic load placement with artificial intelligence growth projection system (e.g., similar to the system 130 shown and described herein with respect to FIGS. 1A-1C) may perform the steps of process flow 700. In some embodiments, an artificial intelligence engine (e.g., such as the AI engine subsystem 200 as shown and described herein with respect to FIG. 2) may perform one or more of the steps of process flow 700. In some embodiments, a datacenter (e.g., similar to the datacenter 302 as shown and described herein with respect to FIG. 3) may perform one or more of the steps of process flow 700.

In some embodiments, and as shown in block 702, the process flow 700 may include the step of querying a request for estimated resource usage for a new database. In some embodiments, a resource allocating platform may receive a request to host a new database. In such embodiments, the request may include data including estimated resources the new database may require for use. Further, the estimated resource usage may include usage estimates for one or more resources. In some embodiments, querying the request may include discerning the structure of the request, loading data of the request into memory (e.g., the memory 104 as shown and described herein with respect to FIGS. 1A-1C), preparing and/or executing a query to select and/or aggregate data from the request, and/or processing the data.

In some embodiments, and as shown in block 704, the process flow 700 may include the step of extracting the estimated resource usage for the new database. In some embodiments, the request may include information including the estimated usage of each resource type required by the new database of the resource allocating platform. Further, the request may include a plurality of additional data that may be not directed to estimated resource usage data of the new database. In such embodiments, after querying the request, the estimated resource usage data of the request may be additionally formatted, validated, post-processed, and/or stored in memory (e.g., volatile memory, nonvolatile memory, and/or the like).

In some embodiments, and as shown in block 706, the process flow 700 may include the step of predicting, using a growth rate, resource usage of one or more databases on a future date. In some embodiments, the growth rate for the resource allocating platform may be calculated (e.g., by the step of block 408 of the process flow 400 as shown and described herein with respect to FIG. 4). In some embodiments, after the growth rate has been generated, a prediction of resource usage of one or more resources of the one or more databases on the future date may be made. In such embodiments, the overall resource usage of some and/or all of the resource types of the resource allocating platform may be found on the future date. For example, the generated growth rate for a first resource usage, the current first resource usage, and/or the future date may be input into a growth model (e.g., a linear growth model, an exponential growth model, a logistic growth model, and/or the like) and the calculation of the model with the input parameters may be performed; thus, calculating a predicted value for the first resource usage on the future date. In some embodiments, resource usage of the one or more resources may be dependent on resource usage of another resource usage of the one or more resource. Stated differently, when calculating the prediction for a resource usage of the one or more resources on the future date, the growth model may use data of one or more other resource usages of the one or more resources (e.g., growth rates, current resource usage, and/or the like of other resources) as inputs to the model. Additionally, and/or alternatively, resource usage of the one or more resources may be independent of resource usage of another resource usage of the one or more resource.

In some embodiments, and as shown in block 708, the process flow 700 may include the step of calculating, via the predicted resource usage and resource capacity, unused resources for a resource allocating platform on the future data. In some embodiments, a datafile of data (e.g., similar to the datafile of the step of block 402 of the process flow 400 as shown and described herein with respect to FIG. 4) for the resource allocating platform may include resource capacity data including the resource capacity (e.g., the highest amount for each resource the resource allocating platform may sustain) for the resource allocating platform. Further, for each predicted resource usage of the one or more resources of the one or more databases of the resource allocating platform, the respective resource capacity may be used in a calculation (e.g., subtraction) along with the predicted resource usage to calculate unused resources for each resource of the one or more resources of the resource allocating platform on the future date.

In some embodiments, and as shown in block 710, the process flow 700 may include the step of comparing the unused resources to the estimated resource usage. In some embodiments, if at least one predicted resource usage exceeds the respective resource capacity of the resource allocating platform, the new database may be determined to be not compatible with the resource allocating platform. In such embodiments, a notification of the determination may be transmitted to an entity that submitted the request. In some embodiments, the unused resource for each resource type of the resource allocating platform may be compared against the estimated resource usage for each resource type of the new database to determine if the resource allocating platform may include sufficient resources to host the new database and the currently hosted one or more databases on the resource allocating platform on the future date.

In some embodiments, and as shown in block 712, the process flow 700 may include the step of determining, if the unused resources exceed the estimated resource usage, the new database is compatible with the resource allocating platform. In some embodiments, after comparing the unused resources to the estimated resource usage, the comparison may determine the new database of the request is compatible with the resource allocating platform (e.g., each resource type of the one or more resource types of the resource allocating platform may have sufficient resources on the future date to accommodate the new database). In such embodiments, a notification (e.g., an alert, a text message, an email, a document, and/or the like) may be generated including data directed to the determination of the request. Additionally, and/or alternatively the output of the determination may be formatted, logged in a storage system with relevant metadata (e.g., in the at least one non-transitory storage device of the step of block 506 of process flow 500 as shown and described herein with respect to FIG. 5), validated, further reported through dashboards and/or additional notifications, documented, and/or integrated for additional processing and/or action (e.g., the resource allocating platform begins building the new database).

In some embodiments, and as shown in block 714, the process flow 700 may include the step of determining, if the estimated resource usage exceeds the unused resources, the new database is not compatible with the resource allocating platform. In some embodiments, after comparing the unused resources to the estimated resource usage, the comparison may determine the new database of the request is not compatible with the resource allocating platform (e.g., at least one of the one or more resource types of the resource allocating platform may not have sufficient resources on the future date to accommodate the new database). In such embodiments, a notification (e.g., an alert, a text message, an email, a document, and/or the like) may be generated including data directed to the determination of the request. Additionally, and/or alternatively the output of the determination may be formatted, logged in a storage system with relevant metadata (e.g., in the at least one non-transitory storage device of the step of block 506 of process flow 500 as shown and described herein with respect to FIG. 5), validated, further reported through dashboards and/or additional notifications, documented, and/or integrated for additional processing and/or action.

The process flow 700 may include additional embodiments, such as any single embodiment or any combination of embodiments described herein. Although FIG. 7 shows example blocks of the process flow 700, in some embodiments, the process flow 700 may include additional blocks, fewer blocks, different blocks, or differently arranged blocks than those depicted in FIG. 7. Additionally, or alternatively, two or more of the blocks of the process flow 700 may be performed in parallel.

FIG. 8 illustrates a process flow 800 for dynamic load placement with artificial intelligence growth projection, in accordance with an embodiment of the invention. In some embodiments, a system (e.g., similar to one or more of the systems shown and described herein with respect to FIGS. 1A-1C) may perform one or more of the steps of process flow 800. For example, a dynamic load placement with artificial intelligence growth projection system (e.g., similar to the system 130 shown and described herein with respect to FIGS. 1A-1C) may perform the steps of process flow 800. In some embodiments, an artificial intelligence engine (e.g., such as the AI engine subsystem 200 as shown and described herein with respect to FIG. 2) may perform one or more of the steps of process flow 800. In some embodiments, a datacenter (e.g., similar to the datacenter 302 as shown and described herein with respect to FIG. 3) may perform one or more of the steps of process flow 800.

In some embodiments, and as shown in block 802, the process flow 800 may include the step of requesting datafiles of data on a plurality of resource allocating platforms. In some embodiments, a new database of a request may be determined to be not compatible with a resource allocating platform. In such embodiments, the datafiles for a plurality of resource allocating platform may be requested and/or transmitted for processing to determine if a resource allocating platform the plurality of resource allocating platform may have sufficient resource on a future date to host the new database. In some embodiments, the step of block 802 may follow the step of block 712 of the process flow 700 as shown and described herein with respect to FIG. 7.

In some embodiments, and as shown in block 804, the process flow 800 may include the step of receiving, via a network interface, the datafiles of data of the plurality of resource allocating platforms. In some embodiments, the data of a datafile of the datafiles of a resource allocating platform of the plurality of resource allocating platforms may include current resource usage data for each database of the resource allocating platform, historical resource usage data for each database of the resource allocating platform, location data of the resource allocating platform, resource capacity of the resource allocating platform, and/or the like. Additionally, and/or alternatively, resources used by a database and/or resources provided by a resource allocating platform may include nonvolatile memory, volatile memory, central processing units (CPUs), network bandwidth, power, heat dissipation, and/or the like. In such embodiments, prior to receiving the datafiles of data, the datafiles may be prepared, segmented and/or encapsulated into packets with headers, transmitted as signals (e.g., optical, electronic, digital, and/or the like) over a network, received by the network interface, and/or reassembled and/or processed by the process flow 800.

In some embodiments, and as shown in block 806A, the process flow 800 may include the step of generating a growth rate from resource usage data of one or more databases of a resource allocating platform of the plurality of resource allocating platforms. In some embodiments, a datafile of the datafiles may be processed to generate the growth rate from the resource usage data of the resource allocating platform of the plurality of resource allocating platforms. In such embodiments, the resource usage data may include historical resource usage data (e.g., an amount of each resource type used on prior dates). Further, the historical resource usage data may be used to calculate a measure of variance in a resource over time. For example, a first resource used by a database may have a first percentage increase between a first prior date and a second prior date. Further, the first resource may have a second percentage increase between the second prior date and a third prior date. Additionally, and/or alternatively, this process may be repeated for each date up to the present day. In this way, the growth rate may be calculated for the resource usage data of the one or more databases. In some embodiments, the growth rates may be generated from calculations using one or more formulas (e.g., $$\left(\frac{X_f - X_i}{X_i}\right) * 100, \left(\frac{X_f}{X_i}\right)^{\frac{1}{n}} - 1, \frac{r_1 + r_2 + \ldots + r_n}{n},$$

and/or the like). In some embodiments, the growth rate may include a single growth rate for a single resource, a single growth rate for a plurality of resources, and/or a plurality of growth rates for a plurality of resources. Additionally, and/or, alternatively the step of block 806A may be performed using the steps of some and/or all of the steps of blocks 404, 406, and/or 408 of the process flow 400 as shown and described herein with respect to FIG. 4.

In some embodiments, and as shown in block 806B, the process flow 800 may include the step of predicting, using the growth rate, resource usage of the one or more databases of the resource allocating platform of the plurality of resource allocating platforms on a future date. In some embodiments, after the growth rate has been generated, a prediction of resource usage of one or more resources of the one or more databases on the future date may be made. In such embodiments, the overall resource usage of some and/or all of the resource types of the resource allocating platform may be found on the future date. For example, the generated growth rate for a first resource usage, the current first resource usage, and/or the future date may be input into a growth model (e.g., a linear growth model, an exponential growth model, a logistic growth model, and/or the like) and the calculation of the model with the input parameters may be performed; thus, calculating a predicted value for the first resource usage on the future date. In some embodiments, resource usage of the one or more resources may be dependent on resource usage of another resource usage of the one or more resource. Stated differently, when calculating the prediction for a resource usage of the one or more resources on the future date, the growth model may use data of one or more other resource usages of the one or more resources (e.g., growth rates, current resource usage, and/or the like of other resources) as inputs to the model. Additionally, and/or alternatively, resource usage of the one or more resources may be independent of resource usage of another resource usage of the one or more resource. In some embodiments, the step of block 806B may be performed similarly to the step of block 410 of the process flow 400 as shown and described herein with respect to FIG. 4.

In some embodiments, and as shown in block 806C, the process flow 800 may include the step of calculating, via the predicted resource usage and a resource capacity of the resource allocating platform, unused resources for the resource allocating platform of the plurality of resource allocating platforms on the future date. In some embodiments, the datafile of data (e.g., similar to the datafile of the step of block 402 of the process flow 400 as shown and described herein with respect to FIG. 4) for the resource allocating platform may include resource capacity data including the resource capacity (e.g., the highest amount for each resource the resource allocating platform may sustain) for the resource allocating platform. Further, for each predicted resource usage of the one or more resources of the one or more databases of the resource allocating platform, the respective resource capacity may be used in a calculation (e.g., subtraction) along with the predicted resource usage to calculate unused resources for each resource of the one or more resources of the resource allocating platform on the future date. In some embodiments, the step of block 806C may be performed similarly to the step of block 708 of the process flow 700 as shown and described herein with respect to FIG. 7.

In some embodiments, and as shown in block 806D, the process flow 800 may include the step of comparing the unused resources to the estimated resource usage. In some embodiments, if at least one predicted resource usage exceeds the respective resource capacity of the resource allocating platform, the new database may be determined to be not compatible with the resource allocating platform. In such embodiments, a notification of the determination may be transmitted to an entity that submitted the request. In some embodiments, the unused resource for each resource type of the resource allocating platform may be compared against the estimated resource usage for each resource type of the new database to determine if the resource allocating platform may include sufficient resources to host the new database and the currently hosted one or more databases on the resource allocating platform on the future date. In some embodiments, the step of block 806D may be performed similarly to the step of block 710 of the process flow 700 as shown and described herein with respect to FIG. 7.

In some embodiments, and as shown in block 806E, the process flow 800 may include the step of determining if there are any remaining datafiles of the datafiles of data. In some embodiments, if there are datafiles of the datafiles of data on the plurality of resource allocating platforms remaining to be analyzed, the process flow 800 may be configured to return to block 806A of the process flow 800 and repeat the analysis of the next datafile of the datafiles of data on the plurality of resource allocating platforms. Additionally, or alternatively, if there are no datafiles of the datafiles of data on the plurality of resource allocating platforms remaining to be analyzed, the process flow 800 may be configured to terminate the analysis steps for the datafiles of data.

In some embodiments, and as shown in block 808, the process flow 800 may include the step of determining among resource allocating platforms of the plurality of resource allocating platforms with unused resources exceeding the estimated resource usage an optimized resource allocating platform. In some embodiments, the determination of the optimized resource allocating platform for the new database may include using the comparisons of the step of block 806D, comparing the physical location data of the plurality of resource allocating platforms, comparing the resource capacity of the plurality of resource allocating platforms, and/or the like. Additionally, and/or alternatively, the aforementioned inclusions to the determination of the optimized resource allocating platform for the new database may be input into a model to calculate the optimal resource allocating platform. In such embodiments, the inputs to the model may be subject to standardization, normalization, weights, numerical encoding, feature engineering, and/or the like prior to use in the model.

In some embodiments, and as shown in block 810, the process flow 800 may include the step of transmitting, via the network interface, a recommendation to build the new database on the optimized resource allocating platform. In some embodiments, a resource allocating platform of the plurality of resource allocating platforms may be determined to be an optimal hosting location for the new database. In such embodiments, the recommendation (e.g., a notification, a document, a datafile, an alert, and/or the like including the optimized resource allocating platform) may be generated and may be transferred to another system, a subsystem, a model, a user, a developer, an entity, and/or the like.

The process flow 800 may include additional embodiments, such as any single embodiment or any combination of embodiments described herein. Although FIG. 8 shows example blocks of the process flow 800, in some embodiments, the process flow 800 may include additional blocks, fewer blocks, different blocks, or differently arranged blocks than those depicted in FIG. 8. Additionally, or alternatively, two or more of the blocks of the process flow 800 may be performed in parallel.

FIG. 9 illustrates a process flow 900 for dynamic load placement with artificial intelligence growth projection, in accordance with an embodiment of the invention. In some embodiments, a system (e.g., similar to one or more of the systems shown and described herein with respect to FIGS. 1A-1C) may perform one or more of the steps of process flow 900. For example, a dynamic load placement with artificial intelligence growth projection system (e.g., similar to the system 130 shown and described herein with respect to FIGS. 1A-1C) may perform the steps of process flow 900. In some embodiments, an artificial intelligence engine (e.g., such as the AI engine subsystem 200 as shown and described herein with respect to FIG. 2) may perform one or more of the steps of process flow 900. In some embodiments, a datacenter (e.g., similar to the datacenter 302 as shown and described herein with respect to FIG. 3) may perform one or more of the steps of process flow 900.

In some embodiments, and as shown in block 902, the process flow 900 may include the step of extracting data from a request for a new database, where the extracted data includes resource usage data and database use data. In some embodiments, the request may include information including resource usage data (e.g., different resource types required by the new database and/or amounts of each resource type required by the new database) and database use data (e.g., an application associated with the new database, a location of the application associated with the new database, a type and/or types of data used by the new database, and/or the like). In such embodiments, the extracted data may be additionally formatted, validated, post-processed, and/or stored in memory (e.g., volatile memory, nonvolatile memory, and/or the like). In some embodiments, the step of block 902 may follow the step of block 702 of the process flow 700 as shown and described herein with respect to FIG. 7.

In some embodiments, and as shown in block 904, the process flow 900 may include the step of analyzing the extracted data. In some embodiments, the extracted data may be directed to resource requirements and/or constraints of the new database. Further, the extracted data may be associated with an application. In such embodiments, the application may be associated with additional databases. Additionally, and/or alternatively, current databases on the resource allocating platform may have similar resource requirements and/or constraints to the new database. In some embodiments, data, including historical resource usage data, on databases with a common application and/or similar constraints may be input into a model. In such embodiments, the model may analyze the extracted data of the new database for data elements that may be shared and/or similar to data elements of other databases to determine which database and/or set of databases to use data from to predict a growth rate for the new database.

In some embodiments, and as shown in block 906, the process flow 900 may include the step of predicting, using the analysis of the extracted data, a growth rate for the new database. In some embodiments, after the analysis of the extracted data of the new database and the association of the new database with existing databases, data (e.g., historical resource usage data) of the associated databases may be input into the model to generate the predicted growth rate (e.g., how one or more resource usages of the new database may change on a future date). For example, the model may predict the growth rate for the new database by analyzing historical resource use data of similar databases, extracting relevant features from the data, training on learned patterns, and/or applying insights gained to estimate growth rates based on the resource requirements and/or constraint of the new database. In this way, the new database and/or a database with no historical data may have growth rates for one or more resources used by the database generated. In such embodiments, the generated growth rates may be used in the determination of an optimal resource allocating platform for the new database and/or a database with no historical data.

The process flow 900 may include additional embodiments, such as any single embodiment or any combination of embodiments described herein. Although FIG. 9 shows example blocks of the process flow 900, in some embodiments, the process flow 900 may include additional blocks, fewer blocks, different blocks, or differently arranged blocks than those depicted in FIG. 9. Additionally, or alternatively, two or more of the blocks of the process flow 900 may be performed in parallel.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will be further understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic load placement with AI growth projection, the system comprising:

a network interface configured to communicate via a communication network;

at least one non-transitory storage device comprising computer program code stored thereon; and at least one processing device operably coupled to the network interface, and the at least one non-transitory storage device, wherein the computer program code comprises computer instructions configured to cause the at least one processing device to:

receive, via the network interface, a datafile of data of a resource allocating platform, wherein the resource allocating platform comprises one or more databases;

query the datafile for resource usage data of the one or more databases and resource capacity data of the resource allocating platform;

extract the resource usage data of the one or more databases and the resource capacity data of the resource allocating platform;

generate a growth rate of the resource usage data of the one or more databases;

predict, via an AI model using the growth rate, resource usage of the one or more databases on a future date;

compare the predicted resource usage of the one or more databases against a resource capacity from the resource capacity data of the resource allocating platform;

determine, based on the comparison of the predicted resource usage against the resource capacity, that the predicted resource usage will exceed the resource capacity on the future date before the resource capacity is actually exceeded;

select, in response to determining that the predicted resource usage of the one or more databases exceeds the resource capacity on the future date, a particular database from the one or more databases for migration based on location of an associated application or growth rates of one or more resources of the particular database; and automatically migrate, in response to determining that the predicted resource usage of the one or more databases exceeds the resource capacity on the future date, a database of the one or more databases from the resource allocating platform to an optimized resource allocating platform, wherein the migration occurs before the resource capacity is exceeded.

2. The system of claim 1, wherein the at least one non-transitory storage device comprises computer-executable program code that, when executed by the at least one processing device, causes the at least one processing device to, when generating the growth rate of the resource usage data of the one or more database: for each database of the one or more databases: select data for a database of the one or more databases; calculate a database first resource growth rate using the historical data of a first resource usage for the database; calculate a database second resource growth rate using the historical data of a second resource usage for the database; and calculate a database growth rate using the database first resource growth rate and the database second resource growth rate; calculate the growth rate via a combination of each database growth rate; and store the growth rate and the database growth rates in the at least one non-transitory storage device.

3. The system of claim 2, wherein the at least one non-transitory storage device comprises computer-executable program code that, when executed by the at least one processing device, causes the at least one processing device to, prior to migrating the database from the resource allocating platform to the optimized resource allocating platform:

generate growth rates for each resource allocating platform of a plurality of additional resource allocating platforms;

compare a growth rate of the resource allocating platform to the growth rates of the each of the plurality of additional resource allocating platforms;

determine the optimized resource allocating platform; and recommend the optimized resource allocating platform to migrate the database to.

4. The system of claim 1, wherein the system is configured to receive a request for a new database on the resource allocating platform, and wherein the at least one non-transitory storage device comprises computer-executable program code that, when executed by the at least one processing device, causes the at least one processing device to, when receiving the request:

query the request for estimated resource usage for the new database;

extract the estimated resource usage for the new database;

predict, via the AI model using the growth rate, resource usage of the one or more databases on a future date;

calculate, via the predicted resource usage and the resource capacity, unused resources for the resource allocating platform on the future date;

compare the unused resources to the estimated resource usage;

determine, if the unused resources exceed the estimated resource usage, the new database is compatible with the resource allocating platform; and determine, if the estimated resource usage exceeds the unused resources, the new database is not compatible with the resource allocating platform.

5. The system of claim 4, wherein the at least one non-transitory storage device comprises computer-executable program code that, when executed by the at least one processing device, causes the at least one processing device to, when determining the new database is not compatible with the resource allocating platform:

request datafiles of data on a plurality of resource allocating platforms;

receive, via the network interface, the datafiles of data of the plurality of resource allocating platforms;

for each datafile:

generate a growth rate from resource usage data of one or more databases of a resource allocating platform of the plurality of resource allocating platforms;

predict, via the AI model using the growth rate, resource usage of the one or more databases of the resource allocating platform of the plurality of resource allocating platforms on the future date;

calculate, via the predicted resource usage and a resource capacity of the resource allocating platform, unused resources for the resource allocating platform of the plurality of resource allocating platforms on the future date; and compare the unused resources to the estimated resource usage;

determine among resource allocating platforms of the plurality of resource allocating platforms with unused resources exceeding the estimated resource usage an optimized resource allocating platform; and transmit, via the network interface, a recommendation to build the new database on the optimized resource allocating platform.

6. The system of claim 4, wherein the at least one non-transitory storage device comprises computer-executable program code that, when executed by the at least one processing device, causes the at least one processing device to, when querying the request for the new database:

extract data from the request for the new database, wherein the extracted data comprises resource usage data and database use data;

analyze the extracted data; and predict, via the AI model using the analysis of the extracted data, a growth rate for the new database.

7. A computer program product for dynamic load placement with AI growth projection, the computer program product comprising a non-transitory computer-readable medium comprising code causing an apparatus to:

receive, via a network interface, a datafile of data of a resource allocating platform, wherein the resource allocating platform comprises one or more databases;

query the datafile for resource usage data of the one or more databases and resource capacity data of the resource allocating platform;

extract the resource usage data of the one or more databases and the resource capacity data of the resource allocating platform;

generate a growth rate of the resource usage data of the one or more databases;

predict, via an AI model using the growth rate, resource usage of the one or more databases on a future date;

compare the predicted resource usage of the one or more databases against a resource capacity from the resource capacity data of the resource allocating platform;

determine, based on the comparison of the predicted resource usage against the resource capacity, that the predicted resource usage will exceed the resource capacity on the future date before the resource capacity is actually exceeded;

select, in response to determining that the predicted resource usage of the one or more databases exceeds the resource capacity on the future date, a particular database from the one or more databases for migration based on location of an associated application or growth rates of one or more resources of the particular database; and automatically migrate, in response to determining that the predicted resource usage of the one or more databases exceeds the resource capacity on the future date, a database of the one or more databases from the resource allocating platform to an optimized resource allocating platform, wherein the migration occurs before the resource capacity is exceeded.

8. The computer program product of claim 7, wherein the non-transitory computer-readable medium comprises code causing an apparatus to, when generating the growth rate of the resource usage data of the one or more database: for each database of the one or more databases: select data for a database of the one or more databases; calculate a database first resource growth rate using the historical data of a first resource usage for the database; calculate a database second resource growth rate using the historical data of a second resource usage for the database; and calculate a database growth rate using the database first resource growth rate and the database second resource growth rate; calculate the growth rate via a combination of each database growth rate; and store the growth rate and the database growth rates in at least one non-transitory storage device.

9. The computer program product of claim 8, wherein the non-transitory computer-readable medium comprises code causing an apparatus to, prior to migrating the database from the resource allocating platform to the optimized resource allocating platform:

generate growth rates for each resource allocating platform of a plurality of additional resource allocating platforms;

compare a growth rate of the resource allocating platform to the growth rates of the each of the plurality of additional resource allocating platforms;

determine the optimized resource allocating platform; and recommend the optimized resource allocating platform to migrate the database to.

10. The computer program product of claim 7, wherein the non-transitory computer-readable medium comprises code causing an apparatus to receive a request for a new database on the resource allocating platform, and wherein the non-transitory computer-readable medium comprises code causing an apparatus to, when receiving the request:

query the request for estimated resource usage for the new database;

extract the estimated resource usage for the new database;

predict, via the AI model using the growth rate, resource usage of the one or more databases on a future date;

calculate, via the predicted resource usage and the resource capacity, unused resources for the resource allocating platform on the future date;

compare the unused resources to the estimated resource usage;

determine, if the unused resources exceed the estimated resource usage, the new database is compatible with the resource allocating platform; and determine, if the estimated resource usage exceeds the unused resources, the new database is not compatible with the resource allocating platform.

11. The computer program product of claim 10, wherein the non-transitory computer-readable medium comprises code causing an apparatus to, when determining the new database is not compatible with the resource allocating platform:

request datafiles of data on a plurality of resource allocating platforms;

receive, via the network interface, the datafiles of data of the plurality of resource allocating platforms;

for each datafile:

generate a growth rate from resource usage data of one or more databases of a resource allocating platform of the plurality of resource allocating platforms;

predict, via the AI model using the growth rate, resource usage of the one or more databases of the resource allocating platform of the plurality of resource allocating platforms on the future date;

calculate, via the predicted resource usage and a resource capacity of the resource allocating platform, unused resources for the resource allocating platform of the plurality of resource allocating platforms on the future date; and compare the unused resources to the estimated resource usage;

determine among resource allocating platforms of the plurality of resource allocating platforms with unused resources exceeding the estimated resource usage an optimized resource allocating platform; and transmit, via the network interface, a recommendation to build the new database on the optimized resource allocating platform.

12. The computer program product of claim 10, wherein the non-transitory computer-readable medium comprises code causing an apparatus to, when querying the request for the new database:

extract data from the request for the new database, wherein the extracted data comprises resource usage data and database use data;

analyze the extracted data; and predict, via the AI model using the analysis of the extracted data, a growth rate for the new database.

13. A computer-implemented method for dynamic load placement with AI growth projection, the method executed by one or more computing processor devices and comprising:

receiving, via a network interface, a datafile of data of a resource allocating platform, wherein the resource allocating platform comprises one or more databases;

querying the datafile for resource usage data of the one or more databases and resource capacity data of the resource allocating platform;

extracting the resource usage data of the one or more databases and the resource capacity data of the resource allocating platform;

generating a growth rate of the resource usage data of the one or more databases;

predicting, via an AI model using the growth rate, resource usage of the one or more databases on a future date;

comparing the predicted resource usage of the one or more databases against a resource capacity from the resource capacity data of the resource allocating platform;

determining, based on the comparison of the predicted resource usage against the resource capacity, that the predicted resource usage will exceed the resource capacity on the future date before the resource capacity is actually exceeded;

selecting, in response to determining that the predicted resource usage of the one or more databases exceeds the resource capacity on the future date, a particular database from the one or more databases for migration based on location of an associated application or growth rates of one or more resources of the particular database; and automatically migrating, in response to determining that the predicted resource usage of the one or more databases exceeds the resource capacity on the future date, a database of the one or more databases from the resource allocating platform to an optimized resource allocating platform, wherein the migration occurs before the resource capacity is exceeded.

14. The computer-implemented method of claim 13, wherein, when generating the growth rate of the resource usage data of the one or more database, the method comprises: for each database of the one or more databases: selecting data for a database of the one or more databases; calculating a database first resource growth rate using the historical data of a first resource usage for the database; calculating a database second resource growth rate using the historical data of a second resource usage for the database; and calculating a database growth rate using the database first resource growth rate and the database second resource growth rate; calculating the growth rate via a combination of each database growth rate; and storing the growth rate and the database growth rates in at least one non-transitory storage device.

15. The computer-implemented method of claim 14, prior to migrating the database from the resource allocating platform to the optimized resource allocating platform, the method comprises:

generating growth rates for each resource allocating platform of a plurality of additional resource allocating platforms;

comparing a growth rate of the resource allocating platform to the growth rates of the each of the plurality of additional resource allocating platforms;

determining the optimized resource allocating platform; and recommending the optimized resource allocating platform to migrate the database to.

16. The computer-implemented method of claim 13, wherein method comprises receiving a request for a new database on the resource allocating platform, and wherein, when receiving the request, the method comprises:

querying the request for estimated resource usage for the new database;

extracting the estimated resource usage for the new database;

predicting, via the AI model using the growth rate, resource usage of the one or more databases on a future date;

calculating, via the predicted resource usage and the resource capacity, unused resources for the resource allocating platform on the future date;

comparing the unused resources to the estimated resource usage;

determining, if the unused resources exceed the estimated resource usage, the new database is compatible with the resource allocating platform; and determining, if the estimated resource usage exceeds the unused resources, the new database is not compatible with the resource allocating platform.

17. The computer-implemented method of claim 16, wherein, when determining the new database is not compatible with the resource allocating platform, the method comprises:

requesting datafiles of data on a plurality of resource allocating platforms;

receiving, via the network interface, the datafiles of data of the plurality of resource allocating platforms;

for each datafile:

generating a growth rate from resource usage data of one or more databases of a resource allocating platform of the plurality of resource allocating platforms;

predicting, via the AI model using the growth rate, resource usage of the one or more databases of the resource allocating platform of the plurality of resource allocating platforms on the future date;

calculating, via the predicted resource usage and a resource capacity of the resource allocating platform, unused resources for the resource allocating platform of the plurality of resource allocating platforms on the future date; and comparing the unused resources to the estimated resource usage;

determining among resource allocating platforms of the plurality of resource allocating platforms with unused resources exceeding the estimated resource usage an optimized resource allocating platform; and transmitting, via the network interface, a recommendation to build the new database on the optimized resource allocating platform.

* * * * *